(12) United States Patent
Whipple et al.

(10) Patent No.: US 7,856,397 B2
(45) Date of Patent: *Dec. 21, 2010

(54) SYSTEM AND METHOD FOR CREATING FINANCIAL ASSETS

(75) Inventors: F. Scott Whipple, Silver Spring, MD (US); Timothy M. McLuckie, Rockville, MD (US)

(73) Assignee: Fannie Mae, Washington, DC (US)

( * ) Notice: Subject to any disclaimer, the term of this patent is extended or adjusted under 35 U.S.C. 154(b) by 1278 days.

This patent is subject to a terminal disclaimer.

(21) Appl. No.: 10/747,740

(22) Filed: Dec. 29, 2003

(65) Prior Publication Data

US 2004/0153384 A1    Aug. 5, 2004

Related U.S. Application Data

(60) Provisional application No. 60/437,065, filed on Dec. 30, 2002.

(51) Int. Cl.
*G06Q 40/00* (2006.01)

(52) U.S. Cl. .......................... 705/38; 705/35

(58) Field of Classification Search ................... 705/38, 705/35, 37
See application file for complete search history.

(56) References Cited

U.S. PATENT DOCUMENTS

| | | | |
|---|---|---|---|
| 5,557,517 A | 9/1996 | Daughterty, III | |
| 5,563,783 A | 10/1996 | Stolfo et al. | |
| 5,692,233 A | 11/1997 | Garman | |
| 5,704,045 A | 12/1997 | King et al. | |
| 5,774,881 A | 6/1998 | Friend et al. | |
| 5,802,501 A * | 9/1998 | Graff ........................ | 705/36 R |
| 5,806,048 A | 9/1998 | Kiron et al. | |
| 5,852,811 A | 12/1998 | Atkins | |
| 5,875,437 A | 2/1999 | Atkins | |
| 5,883,810 A | 3/1999 | Franklin et al. | |
| 5,946,667 A | 8/1999 | Tull, Jr. et al. | |
| 5,966,700 A | 10/1999 | Gould et al. | |
| 5,970,479 A | 10/1999 | Shepherd | |
| 6,012,047 A * | 1/2000 | Mazonas et al. ............... | 705/38 |
| 6,070,151 A * | 5/2000 | Frankel .................... | 705/36 R |

(Continued)

FOREIGN PATENT DOCUMENTS

JP    2004-38372 A    2/2004

(Continued)

OTHER PUBLICATIONS

O'Brien Maria, ; "Passing on plain Vanilla"; Dec. 2001; LatinFinance, p. 23(4); ISSN: 1048-535X.*

(Continued)

*Primary Examiner*—Lalita M Hamilton
*Assistant Examiner*—Edward Chang
(74) *Attorney, Agent, or Firm*—Foley & Lardner LLP

(57) ABSTRACT

A method, the method comprising decomposing each of a plurality of home mortgage loans into a plurality of sub-loan level cash flows, repackaging the plurality of sub-loan level cash flows to form a plurality of financial assets backed by the plurality of sub-loan level cash flows, making a determination of accounting rules that apply to the plurality of financial assets, and storing and tracking accounting data for the plurality of financial assets based at least in part on the accounting rules.

16 Claims, 12 Drawing Sheets

U.S. PATENT DOCUMENTS

| | | |
|---|---|---|
| 6,088,674 A | 7/2000 | Yamazaki |
| 6,088,685 A | 7/2000 | Kiron et al. |
| 6,102,961 A | 8/2000 | Lee et al. |
| 6,112,190 A | 8/2000 | Fletcher et al. |
| 6,167,384 A | 12/2000 | Graff |
| 6,192,347 B1 | 2/2001 | Graff |
| 6,233,566 B1 * | 5/2001 | Levine et al. ............ 705/36 R |
| 6,249,775 B1 | 6/2001 | Freeman et al. |
| 6,304,858 B1 | 10/2001 | Mosler et al. |
| 6,321,212 B1 | 11/2001 | Lange |
| 6,381,586 B1 | 4/2002 | Glasserman et al. |
| 6,460,021 B1 | 10/2002 | Kirksey |
| 6,546,375 B1 | 4/2003 | Pang et al. |
| 6,643,625 B1 | 11/2003 | Acosta et al. |
| 6,999,942 B2 * | 2/2006 | Kemper et al. ............... 705/38 |
| 7,028,007 B1 | 4/2006 | Abrahams et al. |
| 7,099,843 B1 | 8/2006 | Cassidy et al. |
| 7,533,057 B2 | 5/2009 | Whipple et al. |
| 2001/0025264 A1 | 9/2001 | Deaddio et al. |
| 2001/0044762 A1 | 11/2001 | Nault |
| 2002/0035530 A1 | 3/2002 | Ervolini et al. |
| 2002/0055897 A1 | 5/2002 | Shidler et al. |
| 2002/0055905 A1 | 5/2002 | Jannah et al. |
| 2002/0065755 A1 | 5/2002 | Shlafman et al. |
| 2002/0082852 A1 | 6/2002 | Greene et al. |
| 2002/0087373 A1 | 7/2002 | Dickstein et al. |
| 2002/0087445 A1 | 7/2002 | Kaniwa et al. |
| 2002/0103667 A1 | 8/2002 | Jannah et al. |
| 2002/0103738 A1 | 8/2002 | Griebel et al. |
| 2002/0107774 A1 | 8/2002 | Henninger et al. |
| 2002/0116317 A1 | 8/2002 | May |
| 2002/0133456 A1 | 9/2002 | Lancaster et al. |
| 2002/0138299 A1 | 9/2002 | Nations |
| 2002/0156719 A1 | 10/2002 | Finebaum et al. |
| 2002/0174006 A1 | 11/2002 | Rugge et al. |
| 2002/0178101 A1 | 11/2002 | Swift |
| 2003/0009404 A2 | 1/2003 | Kiron et al. |
| 2003/0009405 A2 | 1/2003 | Kiron et al. |
| 2003/0014355 A1 | 1/2003 | Browne et al. |
| 2003/0018570 A1 | 1/2003 | McCabe et al. |
| 2003/0028468 A1 | 2/2003 | Wong et al. |
| 2003/0033225 A1 | 2/2003 | Meldahl |
| 2003/0061148 A1 | 3/2003 | Alavian |
| 2003/0074293 A1 | 4/2003 | Kiron et al. |
| 2003/0074306 A1 | 4/2003 | Rios et al. |
| 2003/0083978 A1 | 5/2003 | Brouwer |
| 2003/0101120 A1 | 5/2003 | Tilton |
| 2003/0103188 A1 | 6/2003 | Zeltzer |
| 2003/0105696 A1 | 6/2003 | Kalotay et al. |
| 2003/0105708 A1 | 6/2003 | Lee |
| 2003/0110045 A1 | 6/2003 | Kehrli et al. |
| 2003/0115128 A1 | 6/2003 | Lange et al. |
| 2003/0135451 A1 | 7/2003 | O'Brien et al. |
| 2003/0144947 A1 | 7/2003 | Payne |
| 2003/0144950 A1 | 7/2003 | O'Brien et al. |
| 2003/0154153 A1 | 8/2003 | Steidlmayer et al. |
| 2003/0163414 A1 | 8/2003 | O'Brien et al. |
| 2003/0208430 A1 | 11/2003 | Gershon |
| 2003/0220861 A1 | 11/2003 | Broms et al. |
| 2003/0225653 A1 * | 12/2003 | Pullman ..................... 705/36 |
| 2004/0006528 A1 | 1/2004 | Fung |
| 2004/0044613 A1 | 3/2004 | Murakami et al. |
| 2004/0059651 A1 | 3/2004 | MaGuire, III et al. |
| 2004/0064331 A1 | 4/2004 | Mayer et al. |
| 2004/0064392 A1 | 4/2004 | Barkman, Jr. |
| 2004/0064393 A1 | 4/2004 | Luenberger |
| 2004/0083158 A1 | 4/2004 | Addison et al. |
| 2004/0098327 A1 | 5/2004 | Seaman |
| 2004/0098329 A1 | 5/2004 | Tilton |
| 2004/0111342 A1 | 6/2004 | Wang |
| 2004/0128227 A1 | 7/2004 | Whipple et al. |
| 2004/0128228 A1 | 7/2004 | Whipple et al. |
| 2004/0128229 A1 | 7/2004 | Whipple et al. |
| 2004/0128235 A1 | 7/2004 | Kemper et al. |
| 2004/0138977 A1 | 7/2004 | Tomkins et al. |
| 2004/0143528 A1 | 7/2004 | Spieler et al. |
| 2004/0148239 A1 | 7/2004 | Albee et al. |
| 2004/0148240 A1 | 7/2004 | Gulati et al. |
| 2004/0153384 A1 | 8/2004 | Whipple et al. |
| 2004/0158515 A1 | 8/2004 | Schoen |
| 2004/0158520 A1 | 8/2004 | Noh |
| 2004/0167812 A1 | 8/2004 | Haney, II |
| 2004/0167848 A1 | 8/2004 | Agarwal et al. |
| 2004/0172356 A1 | 9/2004 | Agarwal et al. |
| 2004/0220872 A1 | 11/2004 | Pollock, II |
| 2005/0021434 A1 | 1/2005 | D'Loren |
| 2005/0027634 A1 | 2/2005 | Gershon |
| 2005/0044019 A1 | 2/2005 | Novick et al. |
| 2005/0065865 A1 | 3/2005 | Salomon et al. |
| 2005/0065941 A1 | 3/2005 | DeAngelis et al. |
| 2005/0075960 A1 | 4/2005 | Leavitt et al. |
| 2005/0075961 A1 | 4/2005 | McGill |
| 2005/0086148 A1 | 4/2005 | Woodruff et al. |
| 2005/0102204 A1 | 5/2005 | Kataoka |
| 2005/0119962 A1 | 6/2005 | Bowen et al. |
| 2005/0125318 A1 | 6/2005 | Jameson |
| 2005/0131789 A1 | 6/2005 | Mintz |
| 2005/0131796 A1 | 6/2005 | Bridges et al. |
| 2005/0165668 A1 | 7/2005 | Hinkle |
| 2005/0177485 A1 | 8/2005 | Peter |
| 2005/0192875 A1 | 9/2005 | White et al. |
| 2005/0197931 A1 | 9/2005 | Gupta |
| 2005/0197952 A1 | 9/2005 | Shea et al. |
| 2005/0203972 A1 | 9/2005 | Cochran et al. |
| 2005/0209876 A1 | 9/2005 | Kennis et al. |
| 2005/0209899 A1 | 9/2005 | King et al. |
| 2005/0216399 A1 | 9/2005 | Colvin |
| 2005/0222928 A1 | 10/2005 | Steier et al. |
| 2005/0222929 A1 | 10/2005 | Steier et al. |
| 2005/0222940 A1 | 10/2005 | Schulman |
| 2006/0074793 A1 * | 4/2006 | Hibbert et al. ................ 705/38 |
| 2007/0255655 A1 | 11/2007 | Kemper et al. |

FOREIGN PATENT DOCUMENTS

| | | |
|---|---|---|
| WO | WO 99/46710 | 3/1999 |
| WO | WO 99/46710 A1 | 9/1999 |
| WO | WO 01/16819 A1 | 3/2001 |
| WO | WO 01/52121 A2 | 7/2001 |
| WO | WO 01/73654 A1 | 10/2001 |
| WO | WO 02/37367 A1 | 5/2002 |
| WO | WO 02/44847 A2 | 6/2002 |
| WO | WO 03/034297 A1 | 4/2003 |
| WO | WO 2004/061552 A2 | 7/2004 |
| WO | WO 2004/061553 A2 | 7/2004 |
| WO | WO 2004/061558 A2 | 7/2004 |
| WO | WO 2004/061559 A2 | 7/2004 |
| WO | WO 2004/061735 A1 | 7/2004 |
| WO | WO 2004/066101 A2 | 8/2004 |
| WO | WO 2004/066102 A2 | 8/2004 |
| WO | WO 2004/072778 A2 | 8/2004 |

OTHER PUBLICATIONS

Little, Kenneth E, Jr. "Commercial real estate software that is user friendly"; Feb. 1994; Mortgage Banking v54, n5, p97(3); ISSN: 0730-0212.*

Hu, Joseph, Ph.D., *Basics of Mortgage-Backed Securities*, Second Edition, © 2001 by Frank J. Fabozzi Associates, New Hope Pennsylvania, 176 pages.

Single-Family REMIC Prospectus, Fannie Mae®, Guaranteed REMIC Pass-Through Certificates, May 1, 2002, 57 pages.

Single-Family MBS Prospectus; Fannie Mae®, Guaranteed Mortgage Pass-Through Certificates (Single-Family Residential Mortgage Loans), May 1, 2002, 46 pages.

Hecht, Ronny; "Servicing difficult loans"; Jul. 1999; Mortgage Banking; vol. 59; Issue 10; starting at p. 84; (7 pgs.).
Avidon, Eric; "How to set prices for subservicing B&C quality mortgages"; Apr. 1, 1996; National Mortgage News; vol. 20; Issue 26; starting at p. 22; (2 pgs.).
Glenn, Gwendolyn; "Small and midsized firms wrestle with servicing decision"; Feb. 22, 1999; Real Estate Finance Today; vol. 16; Issue 7; starting at p. 7; (3 pgs.).
Staples, Ed; "Secondary markets explore securitizing service fees"; Apr. 29, 1996; vol. 13; Issue 9; starting at p. 3; (2 pgs.).
Gilkeson, James et al; "Buy, sell, or hold? Valuing cash flows from mortgage lending"; Nov. 1994; vol. 79; Issue 6; starting at p. 1; (8 pgs.).
International Search Report; International Application No. PCT/US03/36865; Mailed Jun. 15, 2004; 3 pgs.
Final Office Action for U.S. Appl. No. 11/786,456, dated Apr. 29, 2009,37 pages.
U.S. Appl. No. 11/786,456, filed Apr. 11, 2007, Whipple.
International Search Report for International Application No. PCT/US03/37147, mailed Jun. 15, 2004, 3 pgs.
Non-Final Office Action for U.S. Appl. No. 10/302,792, mailed Nov. 16, 2007, 5 pgs.
Non-Final Office Action for U.S. Appl. No. 10/302,792, mailed Dec. 12, 2008, 11 pgs.
Restriction Requirement for U.S. Appl. No. 10/302,792, mailed Jul. 25, 2007, 5 pgs.
U.S. Appl. No. 11/755,603, filed May 30, 2007, Battany.
U.S. Appl. No. 11/788,356, filed Apr. 18, 2007, Ives.
U.S. Appl. No. 11/786,552, Apr. 11, 2007, Kemper.
U.S. Appl. No. 11/786,456, filed Apr. 11, 2007, Whipple.
U.S. Appl. No. 11/786,323, filed Apr. 11, 2007, Whipple.
U.S. Appl. No. 11/726,364, filed Mar. 21, 2007, Washington.
U.S. Appl. No. 10/331,576, filed Dec. 30, 2002, Whipple.
An Investor's Guide to Pass-Through and Collateralized Mortgage Securities, 1997, 12 pages.
Fannie Mae Launches Benchmark REMIC(TM) Issuance, Newswire article, Jun. 16, 2006, 2 pages.
Fannie Mae Prices $2.0 billion of Benchmark REMIC Trust 2006—B1, Fannie Mae News Release, Jun. 20, 2006, 2 pages.
Fannie Mae Prospectus Supplement, Fannie Mae Guaranteed REMIC Pass-Through Certificates Fannie Mae Benchmark REMIC Trust 2006—B1, Jun. 20, 2006, 60 pages.
International Search Report, International Patent Application No. PCT/US03/36855, mailed Jan. 14, 2005, 2 pages.
Recent Tax Developments Affecting Securitizations, McKee Nelson, Oct. 11, 2004, 4 pages.
Fannie Mae Announces Additional Enhancements for Mortgage-Backed Securities Disclosures, Fannie Mae News Release, Oct. 27, 2004, 2 pages.
Fannie Mae Fulfills Commitment to Provide Additional Information on Existing Mortgage-Backed Securities, Fannie Mae News Release, Jun. 12, 2003, 2 pages.
MBSenger, Updating the Investment Community on Fannie Mae Mortgage Products and Programs, Jun. 2006, vol. 1 No. 2, 2 pages.
Freddie Mac; Focus on: Guaranteed Maturity Securities (GMS), believed to be available at least by Mar. 21, 2007, 2 pages.
Freddie Mac, Reference REMIC Series R003, Jun. 1, 2003, 94 pages.
Freddie Mac, Multiclass Certificates, REMIC Certificates, MACR Certificates, Jun. 1, 2003, 68 pages.
Federal Home Loan Mortgage Corporation, Multiclass Certificates Agreement, Jun. 1, 2003, 22 pages.
Mayewski, L., "Interest Rate Swings Inspire New Strategies", Best's Review (Life/Health), vol. 95, n9, Jan. 1995, pp. 45 and 98+.
Lacey, N., "The Detection and Control of Systematic Prepayment Risk in Mortgage-Backed Securities", 1985, vol. 46, p. 2738.
International Search Report, International Patent Application No. PCT/US03/036960, mailed Jun. 10, 2005, 4 pages.
International Search Report, International Patent Application No. PCT/US03/036865, mailed Jun. 15, 2004, 1 page.
International Search Report, International Patent Application No. PCT/US03/37194, mailed Dec. 1, 2004, 3 pages.
Lumpkin, S., "Trends and Developments in Securitization", Financial Market Trends, n74, Oct. 1999, pp. 25-59.
Amended and Restated Trust Agreement, available at least by Apr. 2002 (20 pp.).
SMBS Prospectus, FANNIE MAE Stripped Mortgage-Backed Securities ("SMBS Certificates"), date of Prospectus May 1, 2002 (38 pp.).
International Search Report based on International Application No. PCT/US03/36867, date of mailing of the International Search Report Dec. 29, 2004, 2 pages.

* cited by examiner

| Packet Type | Packet State | Assets | Asset Types | Allocation of Cashflow From Asset | Effective Dates |
|---|---|---|---|---|---|
| 214 | 218 | 222 | 226 | 230 | 234 |

| Header | Map | Process Instructions | Output Requirements |
|---|---|---|---|
| 240 | 242 | 244 | 246 |

SYSTEM AND METHOD FOR CREATING FINANCIAL ASSETS

CROSS-REFERENCE TO RELATED APPLICATIONS

This application claims the benefit of U.S. Provisional Application No. 60/437,065 filed Dec. 30, 2002.

FIELD OF THE INVENTION

The present invention relates generally to investment services, systems, and methods. More particularly, the present invention relates to cash flow systems and methods.

BACKGROUND OF THE INVENTION

Introduction of the mortgage backed security (MBS) has made the dream of owning a home possible for a much larger number of individuals. Frequently, when a borrower takes out a loan to purchase a home, that loan is subsequently pooled with other loans and used to create an MBS. The MBS is an investment instrument that can be sold to investors in the global capital markets. Upon sale of the MBS, lenders can turn around and make new loans using proceeds from the sale. In effect, the MBS is a way for the global capital markets to provide capital for loans to fund home ownership. The increased availability of capital reduces interest rates as compared to the interest rates that would otherwise be available, and therefore makes home ownership more affordable for an increased number of individuals.

While the mortgage backed security approach has worked exceptionally well, home ownership rates could be further improved if loans could be used to create new forms of mortgage backed securities and/or other types of investment instruments or other assets that more optimally align with investor needs. A more optimal alignment would result in further increases in the availability of capital, further reductions in interest rates, and ultimately increased home ownership rates.

Different investors typically have different investment needs. For example, different investors typically have different investment horizons. Thus, some investors may have short investment horizons and may be seeking one or more short term investment instruments, whereas other investors may have longer investment horizons and may be seeking one or more long term investment instruments. Different investors also typically have different risk criteria including different appetites for risk. For example, different investors may seek to avoid or accept different types risk depending on the types of risk already present in their investment portfolio. In the case of diversification, an investor may seek to diversify the investments it holds in order to avoid overexposure to any one type of risk. In the case of more sophisticated risk hedging strategies, an investor may consider itself to be overexposed to a particular type of risk, and may purchase investments that provide an effective hedge or counterbalance against that risk. Hedging is particularly useful for businesses that, by the nature of their business, may become exposed to certain types of risk. By purchasing investment instruments that are exposed to an opposing risk, a counterbalancing effect is achieved that promotes financial stability for the business. Most businesses engage in at least some form of risk management, and a business that effectively manages risk is more likely to survive in the long term for the benefit of its investors, its employees, and its customers.

Therefore, the ability to provide investment instruments of varying investment horizons and risk characteristics is highly beneficial to investors. Even more beneficial would be the ability to more precisely parse risks and other characteristics from a pool of loans so as to create investment instruments that more precisely meet the needs of investors. To the extent this is achieved, homeownership rates and the economy as a whole are likely to benefit.

In the global capital markets, various investment instruments have been created that provide investors with the ability to invest in instruments of varying investment horizons and risk characteristics. For example, in the context of the secondary mortgage market, real estate mortgage investment conduits (REMIC) instruments have been devised. The REMIC is a multiple-class mortgage cash flow security backed residential mortgage loans which generally have been pooled together into MBS trusts. REMIC securities restructure interest and principal payments into separately traded securities. By redirecting the cash flow from the underlying standard MBS, the issue can create a security having several classes, also called tranches, which may carry different coupon rates, average lives, prepayment sensitivities and final maturities. Investors with different investment horizons have the opportunity to own a tranche that satisfies their investment criteria and portfolio needs. These tranches may be designed to emphasize or deemphasize the option risk of the underlying mortgage. Therefore, REMICs have provided a useful investment tool for some investors.

REMICs, however, are limited in terms of the number of different types of investment instruments that can be created. REMICs are created based on MBS, and the typical MBS pooling process typically causes loan level cash flow data to be lost. Therefore, there typically are only so many ways to carve up an MBS to achieve investment instruments characterized by different risks, maturities, and so on. As a result, further improvements are needed.

Often, in the creation of these financial assets, there are involved financial and/or tax accounting rules and/or practices that need to be addressed in transitioning from one type of financial asset to a different type of financial asset. The accounting rules can be internal rules or practices, established for improving the tracking and management of cash flows associated with the financial assets. Alternatively, these accounting rules can be rules or regulations established by regulatory agencies.

Further, there is also a need for tools that accommodate and account for transactions in which cash flows from borrower payments that do not pass through straight to investors or other owners of loans assets, as in structured transactions. Such arrangements are often useful for providing adequate compensation to owners or other stakeholders in such loan assets or for other reasons. Even further, there is a need for a system that can be used to create cash flow aggregation structures and methods of making the same. Further needed is such a system that can be tailored to comply with accounting rules or practices.

A system or method that meets one or more of these needs would be highly desirable. It should also be understood that the techniques described and claimed herein may also be applied to meet other needs instead of or in addition to the above needs. For example, although the systems and methods discussed herein are described in terms of home mortgages, it will be apparent that the systems and methods to other types of assets, loans and/or other investments.

SUMMARY OF THE INVENTION

An exemplary embodiment is related to a method. The method comprises decomposing each of a plurality of home mortgage loans into a plurality of sub-loan level cash flows, repackaging the plurality of sub-loan level cash flows to form a plurality of financial assets backed by the plurality of sub-loan level cash flows, making a determination of accounting rules that apply to the plurality of financial assets, and storing and tracking accounting data for the plurality of financial assets based at least in part on the accounting rules.

Another exemplary embodiment is related to a packet that packages cash flows from financial instruments. The packet comprises packet description data having creation, purpose, and transaction information data describing the packet, a data map including information on cash flows that flow into the packet, and process instructions including information on cash flow processing for the cash flows that flow into the packet and accounting treatment for the packet.

Another exemplary embodiment is related to a method. The method comprises acquiring a home mortgage loan having a loan asset and a servicing asset, compensating a servicer that performs servicing of the loan during a term of the loan, wherein compensation provided to the servicer does not decrease through time during the term of the loan, and accounting for the compensation provided to the servicer, including relating the compensation to the value of the home mortgage loan.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals denote like elements, and:

FIG. 9 is a diagrammatic representation of a packet in accordance with an exemplary embodiment;

FIG. 10 is a diagrammatic representation of a flow diagram depicting exemplary a packet in accordance with another exemplary embodiment;

DETAILED DESCRIPTION OF EXEMPLARY EMBODIMENTS

I. Cash Flow Engine

Figure 1:
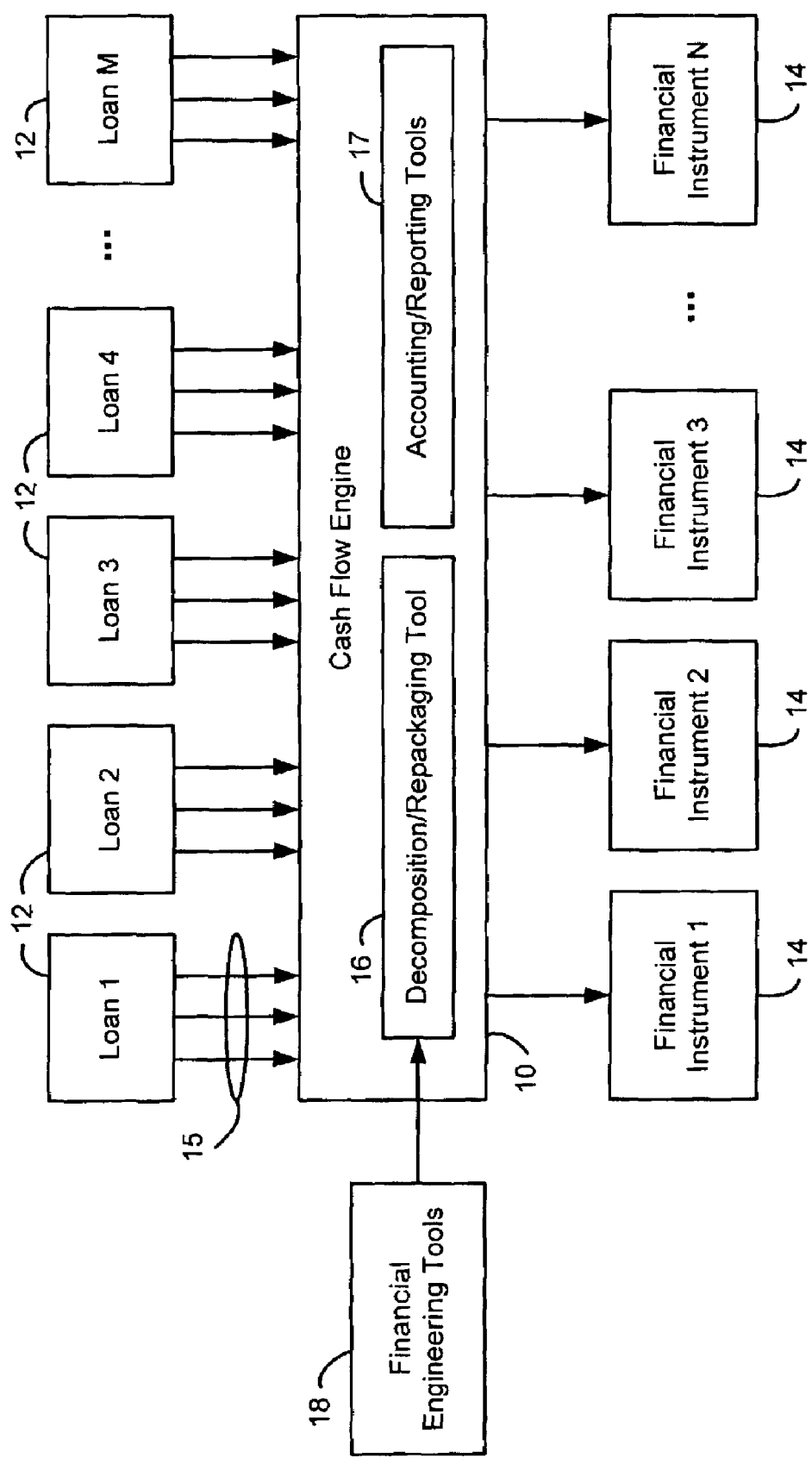
FIG. 1 is a block diagram showing a cash flow engine in accordance with an exemplary embodiment.
Figure 2:
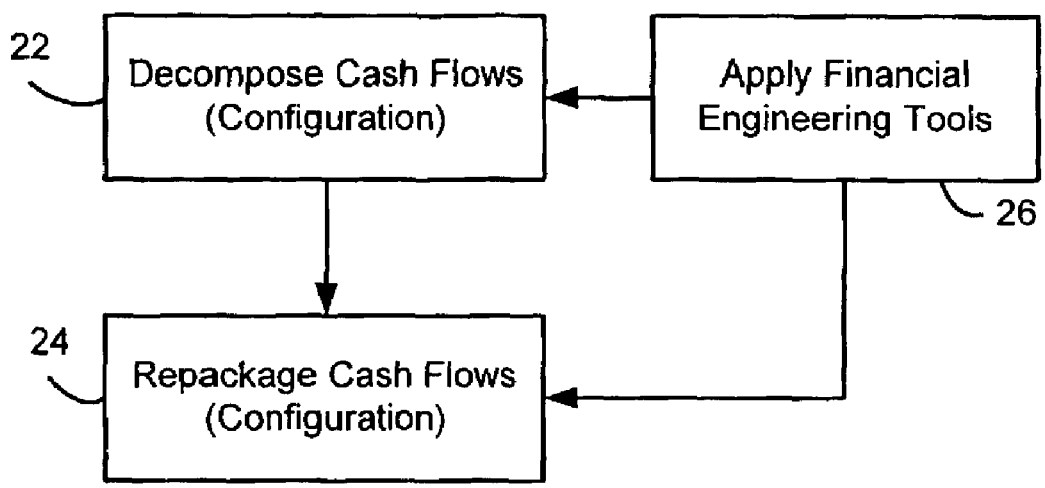
FIG. 2 is a flow chart showing cash flow decomposition in connection with the cash flow engine of FIG. 1 during a loan/asset configuration procedure.

Referring now to FIGS. 1-2, FIG. 1 is a block diagram of a preferred cash flow engine 10 and FIG. is a flowchart showing operation of the cash flow engine 10 of FIG. 1. FIG. 1 shows an arrangement in which the cash flow engine 10 is used in connection with a plurality of loans 12 (individually labeled as Loan 1 through Loan M) and a plurality of financial assets 14 (individually labeled as Financial Asset 1 through Financial Asset N).

In the system of FIG. 1, each of the loans 12 is decomposed into a plurality of sub-loan level cash flows 15 (step 22, FIG. 2). The decomposition may be performed by a decomposition/repackaging tool 16, described in greater detail below, in response to user inputs during a loan set-up procedure, for example. The loans 12 may, for example, be home loans or other types of loans. The cash flows 15 may be defined the same or differently for each of the loans 12. The cash flows 15 may include one or more positive cash flows associated with, for example, principal payments made by the borrower, interest payments made by the borrower, fees paid by the borrower, and so on. The cash flows 15 may also include one or more negative cash flows (or reductions in positive cash flows) associated with expenses or losses incurred with respect to particular loans, such as when a borrower defaults. Such losses/expenses are "negative" cash flows when considered from the perspective of the owner(s) of the financial assets backed by such cash flows. Preferably, the decomposition is performed such that substantially all sources of potential revenue/expenses for each of the plurality of loans is identified and associated with one of the cash flows 15.

Figure 3:
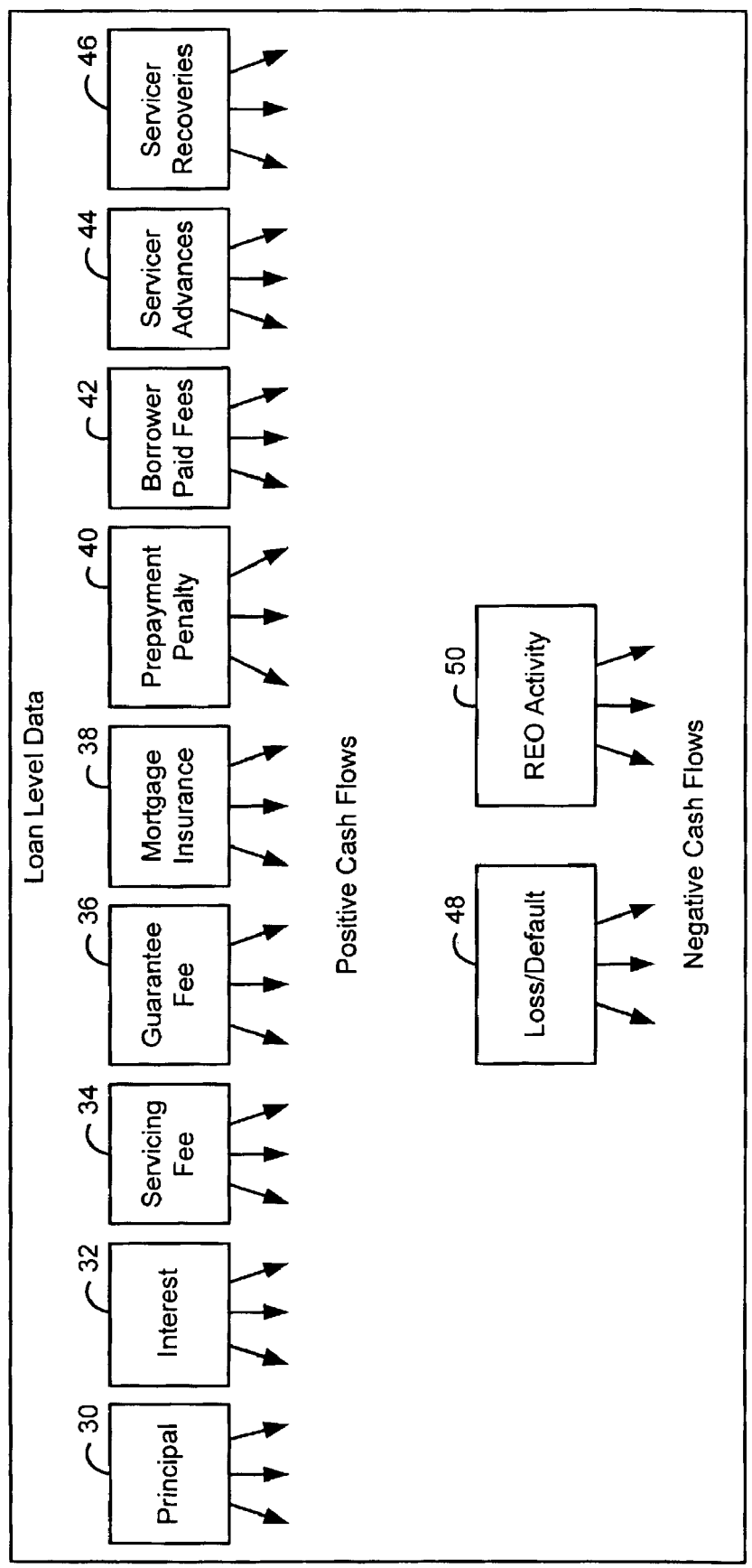
FIG. 3 is a block diagram showing cash flow decomposition in connection with the cash flow engine of FIG. 1.

Referring now also to FIG. 3, exemplary cash flows according to one embodiment are shown. A cash flow may be source of payment, whether of principal, interest, or fees, received in connection with a loan. A cash flow may also be any type of expense incurred in connection with a loan. A given loan may produce positive cash flows associated with principal 30, interest 32, servicing fees 34, guarantee fee 36, mortgage insurance 38, prepayment penalties 40, borrower paid fees 42, servicer advances 44, and servicer recoveries 46, or negative cash flows associated with loss/default 48 and REO activity 50:

TABLE I

Possible Mortgage Cash Flows

| Category | Possible Cash Flows |
|---|---|
| Principal | Scheduled principal (amount payable based on scheduled amortization), actual principal (what was applied as principal), unscheduled principal (amount from borrower applied in excess of scheduled), advanced (amount not collected from borrower but remitted to investor), shortfall (underpayment from borrower, usually meaning less than full scheduled amount) |
| Interest | Scheduled Interest (amount payable), actual (what was applied), excess (interest collection in excess of amount payable), advanced (not collected from borrower but sent to investor), shortfall (underpayment from servicer), capitalized (negative amortization), other capitalized interest |

TABLE I-continued

Possible Mortgage Cash Flows

| Category | Possible Cash Flows |
| --- | --- |
| | (delinquency), unrecoverable prepayment interest shortfall |
| Servicing Fees | Gross servicing fee, core servicing fee (usually relates to tax), excess servicing fee, safe harbor (tax) |
| Guarantee Fees | Gross guarantee fee (GF) (total charged to the lender), cash flows for internally tracking costs (e.g., costs associated with credit risk), base GF, GF variance, and other GF adjustments |
| Mortgage Insurance | Lender paid mortgage insurance (MI), borrower paid MI, portion of GF construed to be MI, back-end MI |
| Prepayment Penalties | Prepayment penalty, prepayment penalty (borrower-paid), yield maintenance fee (borrower-paid). |
| Borrower-paid fees | Borrower-Paid Fees, late payment fee, conversion/modification fee. |
| Seller advances | Advanced principal, advanced interest, advanced guaranty fee, servicing advances (usually relates to defaults, e.g. T&I). |
| Servicer recoveries | Recovered principal advances, recovered interest advances, recovered guaranty fee advances, recovered servicing advances. |
| Default activity | Net realized loss (total amount payable to investors less all recoveries), foreclosure expenses, attorney fees, recoup of non-recoverable advances (detailed by type below), loss due to modification, loss due to appraisal reduction, loss due to deficiency valuation, non-capitalized deferred interest (e.g. workout), interest paid on advances. |
| REO Activity | Foreclosure sale proceeds, rental income, insurance proceeds, tax expenses on REO, repair expenses on REO, sale/marketing expenses on REO, REO property maintenance expenses. |

Herein, the term "cash flow" is used to refer generically to the source of payment (e.g., the right to receive borrower late fees) as well as the cash that flows from the source of payment (e.g., the cash paid by the borrower in the event that late fees are incurred). It may be noted that some of the above cash flows in Table I are aggregate cash flows that can be further decomposed. Other cash flow pertinent information that may be tracked includes unpaid principal balance (UPB) (including scheduled UPB and actual UPB), participation percentage (including principal participation percentage, interest participation percentage, and servicing fee participation (basis points)), discount rate (used to calculate yield maintenance or prepayment penalty), appraised balance, foreclosure sale date, and REO sale date. Although Table I provides one example of cash flows that may be identified for a group of loans, it will be appreciated that other ways of parsing loans into a series of cash flows are also possible. Also, it may be desirable to establish a first set of cash flows for accounting purposes and a second set of cash flows for tax purposes. In general, cash flows may be decomposed in any manner desired including to any level of desired granularity.

Additionally, it is also possible to aggregate cash flows from a borrower perspective or other entity perspective. For example, a series of loans (e.g., all to the same borrower) may be aggregated into a higher order cash flow and then the aggregation of the loans may be decomposed. Also, cash flows may further be derived from loans, pools, securities, commitments, and other packets. It is also possible to add cash flows to existing loans or other assets, for example, so that a new cash flow (e.g., for a new line of credit) may be established without having to set up a new loan. This latter feature provides additional flexibility to modify a borrower's loan over time.

During the decomposition of the cash flows 15, information regarding the initial event that gave rise to the creation of cash flows 15 is preferably tracked and stored for accounting purposes. As detailed below, accounting rules are preferably applied to the financial assets 14 (e.g., packets) that are backed by the sub-loan level cash flows. Therefore, this information may be used to properly account for the event that gave rise to creation of the cash flow such that accounting rules and regulations can be satisfied. Additionally, the information may be used to determine the eligibility of cash flows 15 for inclusion in particular types of assets based on whether the accounting rules and regulations are satisfied.

Referring again to FIGS. 1-2, the decomposition/repackaging tool 16 is then used to repackage the cash flows 15 into a plurality of financial assets 14 backed by the cash flows 15 (step 24, FIG. 2). Herein, the term "financial asset" is used generically to refer to any asset that is backed by one or more cash flows, and includes such things as assets that are created entirely for internal data tracking purposes (e.g., in the case of packets which do not represent securities), as well as assets that have external significance (e.g., in the case of MBS or other financial instruments). The financial assets 14 may each backed by one or a combination of the cash flows identified above. It may be noted that the financial instruments 14 are preferably created such that the collateral for the financial instruments 14 is the plurality of sub-loan level cash flows 15 and not the plurality of loans 12. Also, it is not necessary to securitize the loans 12 and then create financial instruments by performing strips of the security; the financial instruments may be backed directly by the cash flows 15. Such financial assets 14 may be held in the portfolio of, for example, the owner/operator of the cash flow engine 10, or may be sold to a third party investor.

It is possible to use the cash flow engine 10 to create a variety of financial instruments backed by the loan level cash flows 15, which is particularly useful in a situation where the financial asset 14 is a financial instrument configured for sale to a third party investor. As previously indicated, in the past, loans have been pooled to form MBS. The cash flow engine 10 is capable of creating such MBS, as well as other types of financial instruments. The financial instruments may be pass through type instruments such as MBS, or structured instruments such as debt instruments (subordinated debt, unsecured corporate debt, callable debt securities, bonds, etc.), options, swaps, insurance policies, or other instruments where the connection of the asset to the cash flow is less direct than in a pass through instrument. Any combination of one or more cash flows may be selected to create a financial asset. Preferably, such cash flows are aggregated with like cash flows from other loans in creating the financial asset. For example, a financial instrument may be created that is backed only by one or more specific types of borrower paid fees, and not by principal and interest. The financial instruments may be constructed so as to accentuate or deaccentuate specific types of risk (e.g., credit risk). The financial instruments may have different risks/payment profiles depending on which of the cash flows shown in Table I backs the financial instrument. Such financial instruments may be used to transfer interest rate risk, credit risk, and other types of risk to third party investors, and provide the third party investors with the opportunity to pursue more aggressive risk profiles and thereby greater potential yields.

For example, the cash flow engine 10 may be used to issue non-guaranteed corporate debt backed by one or more of the cash flows 15. Therefore, for example, it is possible to create financial instruments that transfer risk in the form of debt to a third party investor, and reward the third party investor for taking on such risk. Thus, for example, a debt instrument may be constructed in which the investor is paid with cash flows derived from principal payments in connection with a group of loans, but a credit loss trigger may be included in which the investor is no longer paid if credit losses exceed a certain level. Such an arrangement is advantageous for the investor because the investor is rewarded for assuming the credit risk associated with the loans. The trigger events used in constructing such debt instruments may be directly related to the group of loans or may be related to some other event.

As another example, financial instruments may be created that are based on special loan programs. For example, for borrowers having marginal credit, a loan program may reward such borrowers with a reduced interest rate after such borrowers have made a certain number loan payments in a timely manner (e.g., a reduction from 7.5% to 6.5%). The potential that the borrower will make timely payments and reduce the cash flows associated with their loan represents a risk that may be sold to a third party investor. For example, for a group of loans consisting of such loans, a first financial instrument may be created that is backed by the underlying 6.5% interest rate, and a second financial instrument may be created that is backed by the additional 1% portion of the interest rate that is subject to elimination after the loan payments are made in a timely manner. The first financial instrument therefore would be relatively insensitive to the risk associated with the reward program, whereas the second financial instrument would have an enhanced sensitivity to such risk. Depending on the portfolio needs of a particular investor, the second financial instrument may fit within the investor's portfolio, for example, by serving as a hedge against other risks.

Many different risk transfer mechanisms may be created using one or more of the different possible cash flow identified in Table I. The cash flows can be decomposed to any desired level of granularity. Due to the high level of granularity of the cash flows can be identified (e.g., as in Table I), and due to the fact that different cash flows represent different types of risk, it is possible to parse out risks from loans with a high degree of precision, and transfer those risks to investors with specific investment needs.

The cash flow engine 10 may also be used to create financial instruments that serve other purposes other than transferring risk. Thus, as yet another example, when a lender sells a loan to a secondary market participant, oftentimes, the lender will retain a portion of the interest as a servicing fee. In some instances, the servicing fee that is charged to a borrower is in excess of the amount that the Internal Revenue Service considers to be a core servicing fee. The core servicing fee is the portion of the servicing fee charged to the borrower that the lender can retain as compensation and still have the sale of the loan be considered a "sale" for tax purposes. Therefore, in order to receive favorable tax treatment for the sale of the loan, lenders typically will retain only the core servicing fee, and the excess servicing fee (the remainder of the servicing fee charged to the borrower) is sold to the purchaser. In some instances, it may be desirable to create a financial instrument that is backed by the excess servicing fee in order to optimize the value that is received for this fee.

As yet another example, financial instruments may be created that correct certain anomalies that may exist in certain situations. For example, with regard to servicing fees, there is a mismatch between the manner in which servicers are paid and the servicers' cost structure. Servicers typically retain a portion of the interest that is paid by a borrower each month as compensation for performing the servicing function. Because the interest portion of a borrower's monthly payment decreases each month as equity increases, the servicer's compensation also decreases incrementally each month. However, the cost of servicing loans does not decrease each month, particularly when costs associated with defaulted loans are taken into account. Therefore, it is possible to repackage the cash flows from the underlying loans to create a payment structure for the servicer that is more closely aligned with the servicers' cost structure.

In order to assist with the generation of such financial instruments and other assets, the cash flow engine 10 may also be coupled to financial engineering tools 18 (step 26, FIG. 2), which are tools usable by an operator to analyze, design, develop, and/or implement the financial assets 14 and/or related processes. For example, the financial engineering tools 18 may be computer-implemented tools usable for analyzing financial data, assessing and predicting financial performance, valuing financial assets, analyzing financial risk, and so on, regarding the loans 12, the financial assets 14 and/or the cash flows 15. To this end, the financial engineering tools 18 preferably include tools responsive to operator inputs for creating and displaying interactive graphs and other visual representations of financial data using mathematical models and simulations. Such models and simulations may be constructed using the financial engineering tools 18 and may take into account market conditions, contract terms, and other factors, with different models being available for different financial instruments to allow the model that best represents market dynamics and other factors such as contract terms to be selected.

Additionally, certain accounting rules may apply that may affect the manner in which cash flows may be most optimally stripped and the manner in which financial assets may be most optimally created. In the above example, where it is desirable to create a financial asset based on the servicing fees for a loan or a collection of loans, accounting rules may apply that state that the servicing fees cash flow is an interest strip and must be accounted for as an interest only strip. An interest only strip is a type of strip that subjects the cash flow to derivative accounting, meaning that a lender must recognize gains or losses when the market value of the underlying asset increases or decreases in value. Therefore, the financial engineering tools 18 preferably include tools usable to assess financial risk, predict financial performance, and so on, of financial assets in view of such accounting rules.

Figure 4:
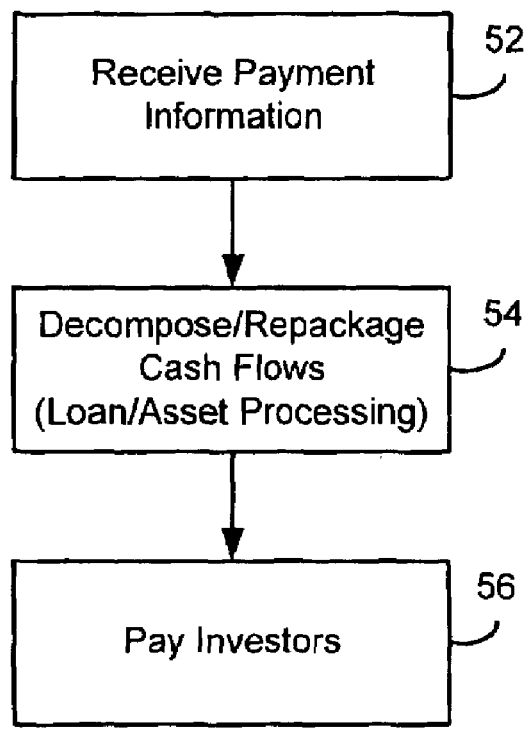
FIG. 4 is a flow chart showing cash flow decomposition in connection with the cash flow engine of FIG. 1 during loan/asset processing.

Referring now also to FIG. 4, after the financial assets 14 are created using the decomposition/repackaging tool 16, payments in connection with the financial assets 14 are funded by the cash flows from the loans 12. For example, in the case of an investment instrument that has been sold to a third party investor, the cash flows may be used to fund payments to the investor (either on a straight pass through basis or on a structured basis, depending on the type of financial instrument created).

The cash flow engine 10 includes accounting/reporting tools 17 which receives payment information regarding incoming cash flows associated with the loans 12 (step 52). The payment information may be received from a computer system that supports loan servicing. The payment information may, for example, include information regarding scheduled principal payments made by the borrower, unscheduled principal payments made by the borrower, interest payments made by the borrower, fees paid by the borrower, and so on. The borrower payments are then decomposed into the various defined cash flows (step 54). If the computer system that performs loan servicing supports such reporting, the payment information may be received in a more granular form and include information regarding each of the cash flows processed by the cash flow engine 10. Otherwise, the information regarding such cash flows may be computed by the cash flow engine 10 based on the information reported by the servicing computer system. The payment information is then processed in accordance with stored mapping information regarding the manner in which cash flows flowing into the financial assets 14 are traceable back to the cash flows 15. Thus, after the mapping information is accessed, portions of the loan payments corresponding to the level cash flows 15 for each of the loans 12 are repackaged and allocated to a respective one of the financial assets 14 based on the mapping information (step 54). As a result, information regarding investment proceeds due to the owner(s) of the financial assets 14 is generated, and the owner(s) of the financial assets 14 may be paid with funds derived from the loan payments and in accordance with the repackaging of the cash flows 15 to the respective ones of the financial assets 14 (step 56).

According to an exemplary embodiment, the accounting/reporting tools 17 apply accounting rules directly to the financial assets 14, even though many of the financial assets 14 are not necessarily loans or securities. As has been described, the financial assets 14 are created by repackaging the cash flows 15. The accounting treatment that is given to each financial asset 14 depends on the nature of the cash flows 15 which back the particular financial asset. For example, if a plurality of cash flows 15 derived from borrowers in connection with a corresponding plurality of different loans is repackaged to form one of the financial assets 14, and the nature of the cash flows requires interest-only accounting, then that financial asset 14 may be accounted for as an interest only strip. Thus, for each of the financial assets 14, the nature of the cash flows that are repackaged to form the financial asset 14 is analyzed to determine the proper accounting treatment for the financial asset 14. After the appropriate accounting treatment is determined (typically during steps (22-26), accounting calculations may be performed during the life of the financial asset in accordance with the determined appropriate accounting treatment. To this end, the accounting/reporting tools 17 therefore preferably includes tools for performing typical accounting calculations such as present value, depreciation, and so on. Additionally, the payment information received by accounting/reporting tools 17 includes information pertinent to accounting such as information concerning the origin and timing of the payments or other cash flows and other relevant information.

Thus, the cash flow engine 10 permits the financial engineering tools 18 to be used in connection with the purchasing and repackaging of loan assets into financial instruments. Particularly, each of the loans 12 has associated with it a number of different cash flows which are parsed and reconfigured into a variety of different financial instruments 14. The cash flow engine 10 decomposes each loan into its constituent parts and allows financial engineering tools 18 to be applied at the loan level rather than only at the pool level. Additionally, the cash flow engine 10 is able to process cash flow information at a much higher level of granularity than has been possible in the past. For example, not only is the cash flow engine 10 able to track interest payments from each loan, but the interest payments may be subdivided into constituent cash flows such as servicing fees, G-fees, and pass through interest. The cash flow engine 10 also recognizes the existence of other types of cash flows which have not traditionally been viewed as cash flows that could accrue to an investor (e.g., late fees, prepayment penalty fees, and so on). The cash flow engine 10 is also recognizes the existence of negative cash flows (e.g., in situations where a borrower defaults on the loan).

These features provide greater flexibility in creating financial instruments and allow more optimal financial instruments to be created. In particular, financial instruments may be created that are more optimally aligned with what the purchaser wishes to purchase.

The cash flow engine 10 also provides benefits even in situations where the financial instruments 14 are not sold to external investors. For example, a holder of loan assets may use the cash flow engine 10 and the financial engineering tools 18 to examine loan assets at a high level of specificity and granularity. The cash flow engine 10 provides the ability to more precisely track risks, monitor performance, and perform other detailed analysis in connection with various aspects of the plurality of loans 12. This allows the investor to obtain a better understanding of how the loan assets performed which would in turn would allow the investor to make better decisions about which assets to buy in the future.

Additionally, the high level of data granularity allows more accounting information to be associated with each of the cash flows 15. This accounting information aids in compliance with accounting rules and regulations. The information further aids the user in tracking cash flows for internal accounting to optimize analysis of processes and cash flows.

Figure 5:
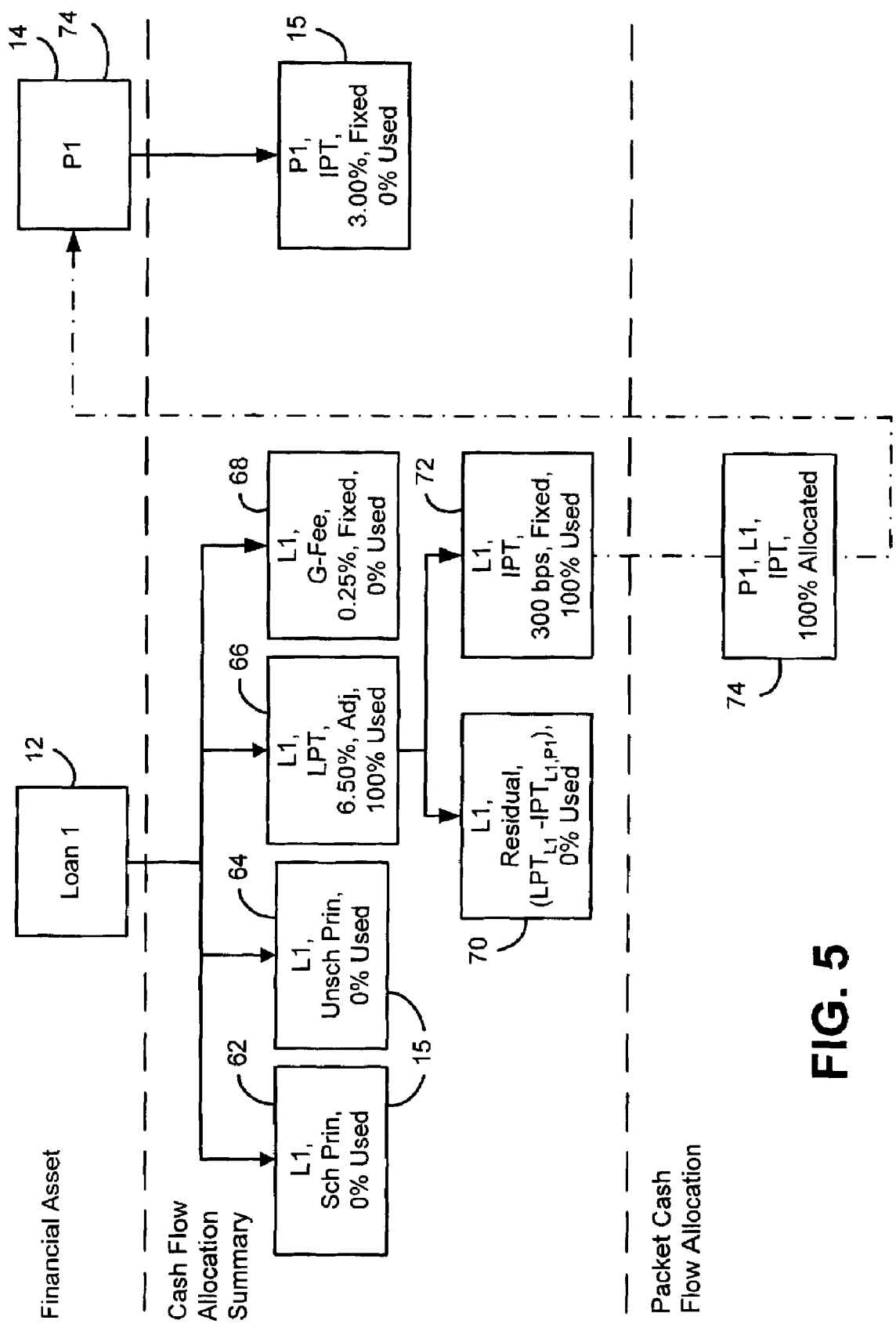
FIGS. 5-7 are examples showing operation of the cash flow engine of FIG. 1.

Referring now to FIG. 5, an example of a cash flow decomposition/repackaging operation that may be performed by the cash flow engine 10 is illustrated. Although the cash flow repackaging operation is shown in connection with one of the loans 12 shown in FIG. 1, it will be appreciated that similar operations are also performed with respect to other ones of the loans 12 shown in FIG. 1.

FIG. 5 is divided into three rows. The first row, labeled "financial asset," illustrates the financial asset (e.g., loan, packet, etc.) that is the source of the cash flows under consideration. The second row, labeled "cash flow allocation summary," illustrates cash flows that are available from the financial asset contained in the first row. Preferably, the cash flow engine 10 stores the information embodied in the second row in the form of a cash flow allocation summary ("CFAS") map. The CFAS map represents the manner in which loans are decomposed into cash flows. The third row, labeled "packet cash flow allocation," illustrates how the cash flows identified in the second row are used by packets. As described in greater detail below in connection with FIGS. 8-11, a "packet" is an aggregation or packaging of cash flows that is treated as an entity separate and distinct from the incoming cash flows that support it and from the cash flows that result from it. A packet is an example of a financial asset used for internal mapping and data tracking. As in the case of the CFAS map, preferably, the cash flow engine 10 stores the information embodied in the third row in the form of a packet cash flow allocation ("PCFA") map which shows the cash flows that flow into packets.

In the example of FIG. 5, the loan 12 has a scheduled principal cash flow 62, an unscheduled principal cash flow 64, an LPT (or lender pass through portion of the interest rate) cash flow 66, and a guarantee fee ("G-fee") cash flow 68. The scheduled principal cash flow 62, the unscheduled principal cash flow 64, and the G-fee cash flow 68 are represented as being unallocated. The LPT cash flow 66, shown to be 6.5% adjustable rate interest, is represented as being 100% allocated between a residual cash flow 70 and an IPT (or investor pass through portion of the interest rate) cash flow 72. The portion of the cash flow 66 which is allocated to the IPT cash flow 72 is 300 bps fixed rate interest; the remainder is allocated to the residual cash flow 70. The IPT cash flow 72 is 100% allocated to a packet 74. The packet 74 may then be used to back a financial instrument, or may be further decomposed in generally the same manner that the cash flow 66 is decomposed. In other words, the decomposition/repackaging may be performed both regard to the loan 12 and other financial assets 14 to create multiple layers of cash flow decomposition/repackaging. It is thus seen that complete flexibility is achieved in the manner in which cash flows may be decomposed and repackaged to form financial instruments or other financial assets.

Figure 6:
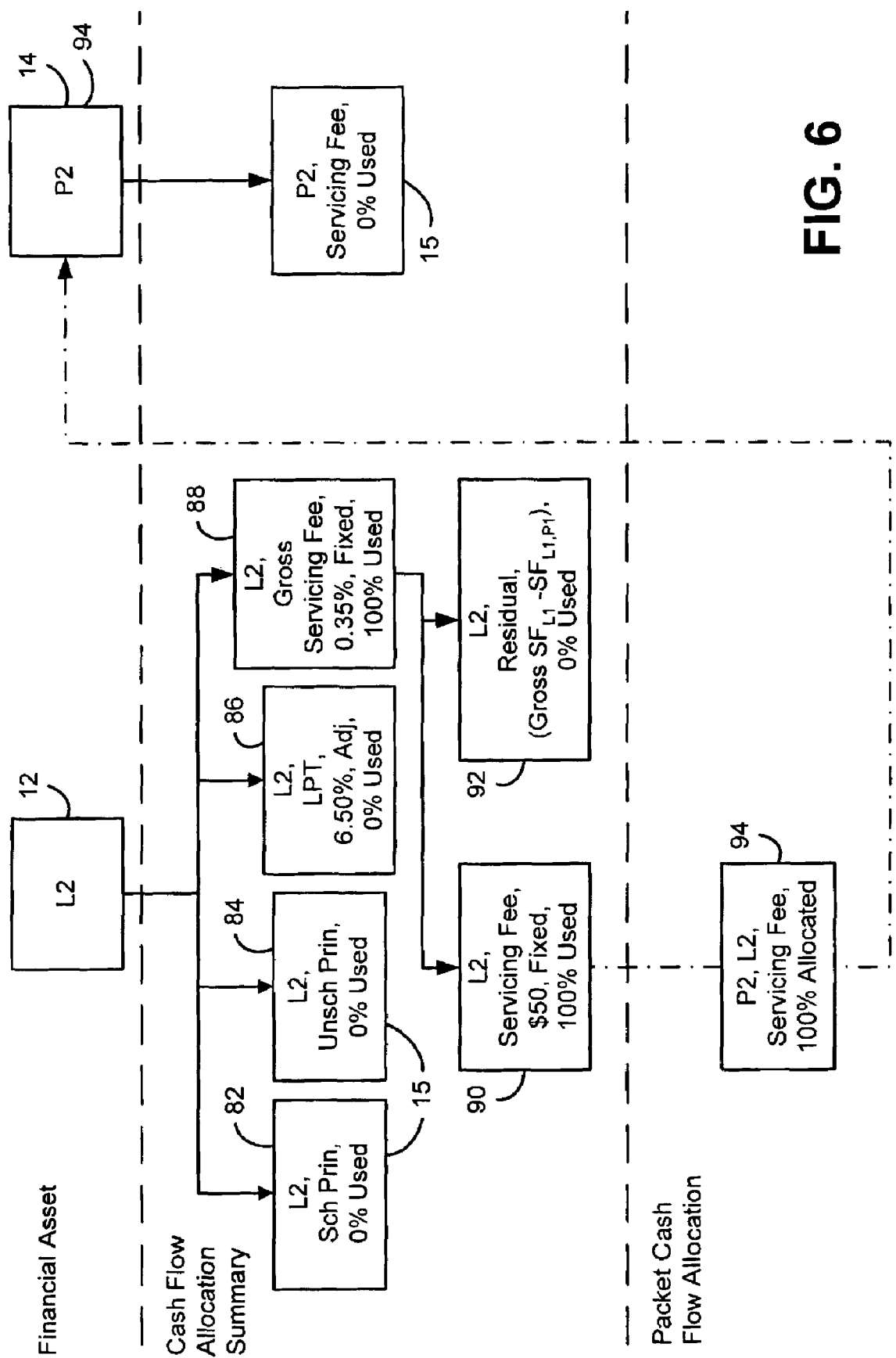

Referring now to FIG. 6, another example of a cash flow decomposition/repackaging operation that may be performed by the cash flow engine 10 is illustrated. In the example of FIG. 6, the loan 12 has a scheduled principal cash flow 82, an unscheduled principal cash flow 84, an LPT cash flow 86, and a gross servicing fee cash flow 88. The cash flows 82-86 are unallocated. The gross servicing fee cash flow 88 is, shown to be 0.35% fixed rate, is represented as being 100% allocated between a fixed ($50) servicing fee cash flow 90 and a residual cash flow 92. The fixed servicing fee cash flow 92 is 100% allocated to a packet 94. The packet 94 is a financial asset in the form of a fixed ($50/month) servicing fee.

Thus, the arrangement of FIG. 6 may be used to address the above-mentioned problem regarding compensation structures for servicers. Specifically, in conventional mortgage products, the loan asset comprises a right to receive loan payments (including a principal payment portion and an interest payment portion) from a borrower in connection with the loan. The servicing asset comprises a right to receive a servicing fee portion of the interest payment portion in exchange for performing servicing of the loan. However, as the unpaid principal balance of the loan decreases, the servicing fee portion of each loan payment also decreases, even though the costs of servicing loans typically increases on average further into the term of the loan.

Pursuant to the arrangement of FIG. 6, a secondary market participant (e.g., an investor in loans) may acquire a home mortgage loan 12 having a loan asset and a servicing asset. The secondary market participant then repackages the cash flows associated with the loans to create a modified servicing fee (packet 94) which provides a different compensation structure for the servicer than the servicing fee portion of the loan payment. The secondary market participant then subcontracts responsibility for performing servicing of the loan to a servicer and compensates the servicer with the modified servicing fee. Alternatively, rather than subcontracting servicing, the secondary market participant could also resell the servicing asset to the servicer in a modified form in which the servicing asset permits the servicer to retain the modified servicing fee. Either way, the servicer performs servicing of the loan during the term of the loan and receives the modified servicing fee as compensation. As illustrated, the compensation provided to the servicer does not decrease through time during the term of the loan, but rather is fixed (e.g., a $50 monthly payment). Alternatively, the modified servicing fee may be constructed so as to increase during the term of the loan. In practice, given that it is the servicer that receives loan payments from the borrower, compensating the servicer may simply comprise permitting the servicer to retain its compensation from payments received by the servicer from a borrower before the payments are aggregated and forwarded to the secondary market participant. Thus, the arrangement of FIG. 6 produces a payment structure that is more closely aligned with the servicers' cost structure, addressing the servicer cost structure problem previously described.

It may also be noted that, over time, when the gross servicing fee cash flow 88 portion of the loan payment becomes less than $50 due to increased equity, the residual cash flow 92 will become a negative cash flow. The negative cash flow operates to reduce other positive cash flows (not shown) in an amount necessary to provide the servicer with a fixed $50/month servicing fee even though interest payments on the loan are decreasing. Notably, therefore, the system 10 is capable of tracking negative cash flows.

Preferably, in this arrangement, additional accounting information is tracked to properly account for the underlying assets. For example, the value of the gross servicing fee cash flow 88 portion of the loan payment may need to be related to the value of the loan 12 from which it originates to properly satisfy accounting rules. Accordingly, this information may be analyzed and tracked by the accounting/reporting tools 17 to facilitate accounting.

Figure 7:
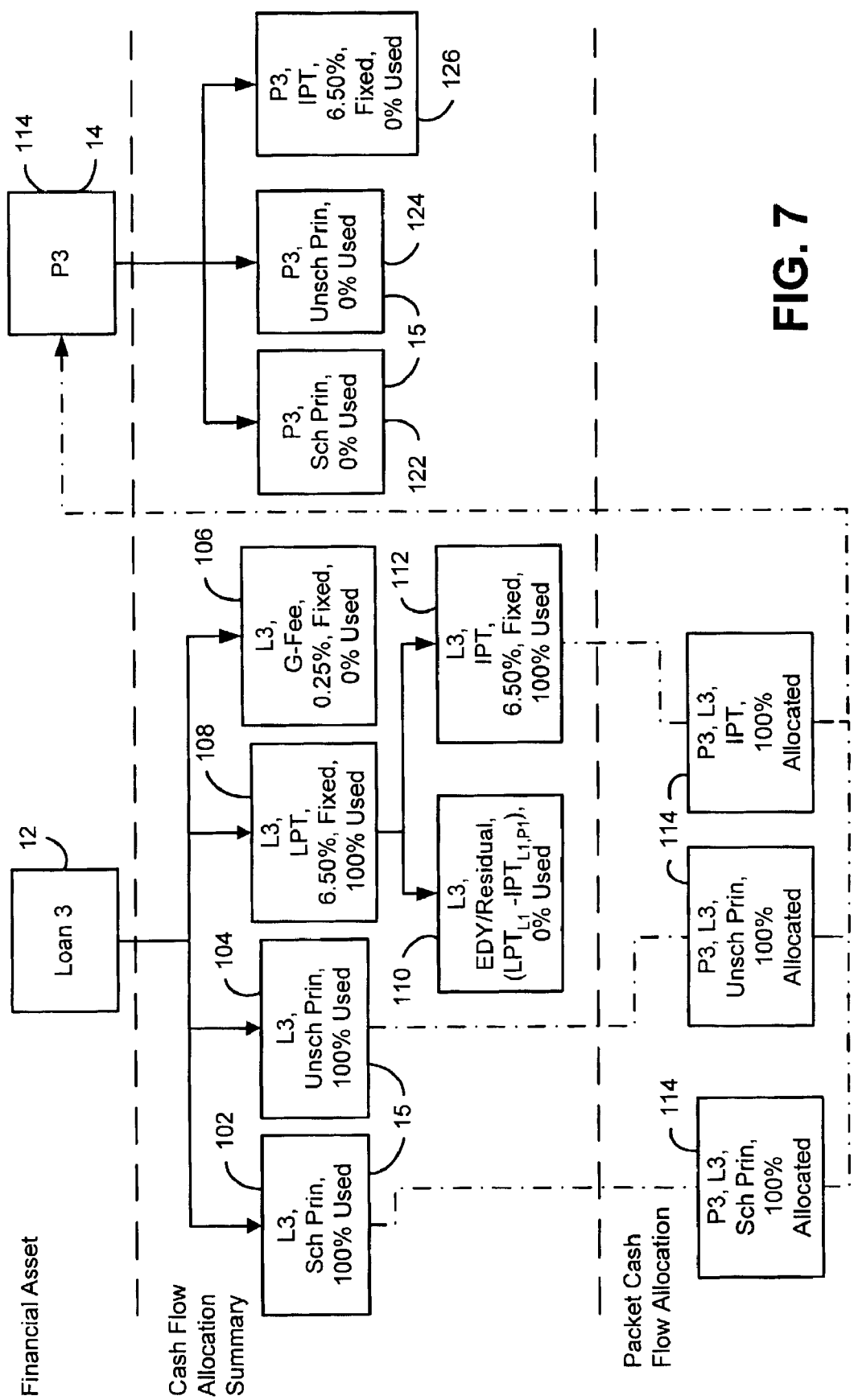

Referring now to FIG. 7, another example of a cash flow repackaging operation that may be performed by the cash flow engine 10 is illustrated. In the example of FIG. 7, the loan 12 has a scheduled principal cash flow 102, an unscheduled principal cash flow 104, a LPT cash flow 106, and a G-fee cash flow 108. The cash flows 102 and 104 are 100% allocated to a packet 114. The cash flow 106 is unallocated. The cash flow 108 is 100% allocated to a residual cash flow 110 and a IPT cash flow 112, which is 100% allocated to the packet 114. The packet 114 may receive similar cash flows from other ones of the loans 12. The packet 114 is decomposed to produce a scheduled principal cash flow 122, an unscheduled principal cash flow 124 and a IPT cash flow, 126, each of which is shown as being unallocated.

FIGS. 5-7 represent both the manner in which decomposition and repackaging occur during loan/asset set up and the manner in which decomposition and repackaging occur during loan/asset data processing during the life of the loans 12. In connection with loan/asset data processing during the life of the loans 12, it may be noted that FIGS. 5-7 present a static view of data processing and particularly the way in which cash flows flow from the loans 12 to the assets 14. Of course, there is also a dynamic (time-based) aspect loan/asset data processing due to the fact that borrower payments may be received on different days, servicers have different deadlines for reporting data, and so on. Therefore, cash flows may flow into certain ones of the financial assets (packets) 14 on certain days and flow into other ones of the packets assets (packets) 14 on different days. Preferably, and as described in greater detail below in connection with FIGS. 8-11, the packets are created so as to include process instructions that take such time-based elements into account.

Figure 8:
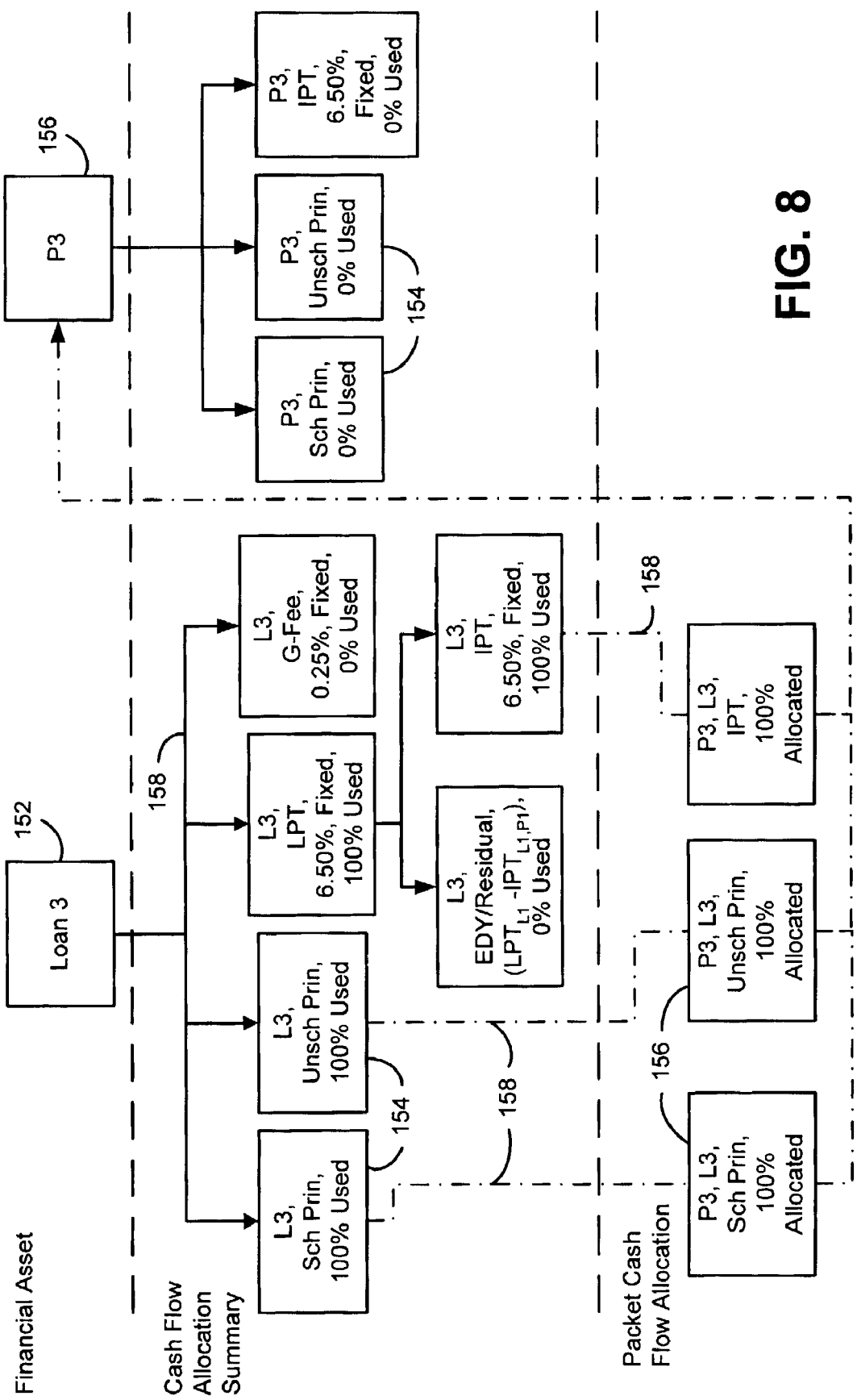
FIG. 8 is an example of a graphical user interface usable in connection with the cash flow engine of FIG. 1.

Referring now to FIG. 8, in order to perform cash flow decomposition and repackaging during loan/asset set up, a graphical user interface (GUI) may be used that displays decomposition and repackaging information to a user and receives operator inputs used in creating/modifying relationships between loans, cash flows, and assets. Such a GUI may comprise an operator input interface (e.g., program logic) that receive operator inputs using a suitable input devices (e.g., keyboard, mouse, and so on) and a display interface (e.g., program logic) that drives an output device (e.g., computer display) to display indicia regarding the loans 12, the assets 14 and the cash flows 15 in tabular, iconic, block diagram, or other formats.

For example, in one embodiment, the graphical user interface is organized in a manner generally similar to FIGS. 5-7. Thus, FIG. 8 is the same as FIG. 7, except that reference numbers have been changed such that a description of an exemplary GUI 150 may be given. The GUI 150 comprises a display interface which displays indicia (icon 152) representative a home mortgage loan 12, indicia (e.g., icons 154) representative of the cash flows 15, indicia (e.g., icons 156) representative of the plurality of financial assets 14, and indicia (e.g., lines 158 extending between the icons 152-156) representative of a manner in which cash flows that flow into the financial assets 14 are traceable back to one or more of the plurality of home mortgage loans 12. Other information may also be displayed. For example, in the illustrated embodiment, information regarding an extent to which individual ones of the cash flows 15 have been allocated (e.g., "100% used") to the financial assets 14. Additionally, the icons 152-156 may also be displayed in a manner (e.g., different colors, different symbology, and so on) that provides additional information regarding the type of loan, cash flow, or asset that the icon is intended to represent.

As numerous decomposition/repackaging operations are performed for multiple loans and multiple financial assets, different icons are displayed that represent the different loans, the different cash flows, and the different assets. Such information may be either displayed simultaneously or at different times on different display screens, depending on how much information it is considered desirable to provide operator with at once. The operator input interface then receives operator inputs which define the manner in which each of the loan 12 are to be decomposed into the cash flows 15 and the manner in which the cash flows 15 are to be repackaged to form the financial assets 14. For example, the operator interface may receive inputs identifying specific loans for decomposition, cash flows that are to be decomposed, the allocation of the cash flows from one or more loans to one or more specific assets, the allocation of cash flows between assets, and so on. The operator inputs may also be used in connection with sifting logic and sorting logic. As will be described in below, sifting logic is provides a mechanism by which users can examine the entire collateral universe and pair down to smaller groupings of collateral or assets within the universe, and sorting logic provides a mechanism by which user may group the subset of collateral identified in the sifting process and organize it by a single or multiple attributes to further refine the pool of candidate collateral to be placed into a potential packet.

II. Packet System

Referring now to FIGS. 9-13, exemplary embodiments of a packet system and related methods will now be described. These exemplary embodiments describe the creation, maintenance, and dissolution of cash flow aggregation structures, or "packets." Such a structure includes a mapping of asset cash flows to a higher order and the effective dates for those mappings. The cash flow aggregation structures and methods can be implemented in a wide variety of different ways. Various embodiments may include, for example, packets with other types of attributes or packets formed in other ways than those described.

In the preferred system of FIGS. 9-13, a packet is an aggregation or packaging of cash flows that is treated as an entity separate and distinct from the incoming cash flows that support it and from the cash flows that result from it. The packet can be used for both the collection and distribution of data and monies. Although, exemplary embodiments described herein use the term "packet" to refer to the distribution or re-distribution of cash flows after their collection, the interpretation of "packet" should not be limited by the examples provided.

Packets provide data integrity of underlying reported assets and create an information chain that maps to a higher-order form of recognized asset. The source data for packets may be loan-level or packet-level information, and the packets themselves may represent actual securities or just a unit of reporting and remittance.

Besides capturing the relationship between sources of cash flow and the packaging thereof, a packet also tracks certain descriptive data about itself. For example, a packet has information about its own attributes, the disposition of its cash flows, and any reported output, including disclosure data. Additionally, a packet describes its process behavior, which may be derived from external business rules. These business rules may be standard (as would be the case for mortgage-backed security packets), or they may apply to a specific packet (as might happen in a structured transaction). Sources of incoming cash flows to a packet may be loan remittances, percentages of loan remittances, pool distributions, percentages of pool distributions, securities, or other types of synthetic or real assets.

Packets provide a data map that permits inspection of loan assets and securities assets when data exists at both levels. The ability to create and manipulate packets enables the creation of new types of financial products. Packets also improve the processing of transactions and support of new types of transactions within the secondary market.

By way of example, FIG. 9 illustrates a packet 210 including a packaging of cash flows. The packet 210 can include packet type information 214, packet state information 218, asset information 222, asset type information 226, information 230 regarding allocation of cash flows from asset, and effective date information 234.

The packet type information 214 indicates the type of financial asset associated with the packet, for example, the packet 210 may be associated with an OOP (out of portfolio) pool, MBS pool, lender-formed MBS pools, Mega, Choice pools, Majors, Pseudo pool, Reference pool, excess servicing strip, excess/deficit yield, stripped loan, or other type of structure. The packet type information 214 may also describe, for example, who is expected to initiate the creation of this packet type, how the packet to be created, attributes required for creation of the packet, minimum set of disclosure data, packet statistics, estimated frequency of creation, rules for dissolving the packet if the packet is in production, necessary accounting events, and system(s) responsible for performing roll-up of the packet. The packet type helps determine which business rules to apply. The packet type further enables the accounting/reporting tools 18 to make a determination as to which accounting rules to apply.

The packet state information 218 indicates whether, for example, the packet is at a pre-packet, pending packet, or production packet stage. The asset information 222 indicates a set of assets, such as, loan #1 interest, loan #1 principal, loan #2 principal, etc. The asset type information 226 indicates the underlying asset type, e.g., loan, MBS, etc. The information 230 regarding allocation of cash flows from asset indicates, for example, the money amount, percentage allocation, or basis point amount of the cash flow. The effective date information 234 indicates the effective dates for the participation of each cash flow in the packet.

Although several specific attributes are described as composing packet 210, additional, fewer or different attributes may be used for packet creation. Examples of additional attributes can include: applicable business rules, alternate exception flow, additional reporting/disclosure requirements, additional accounting components, ticker symbol, and conduit tagging specification for underlying cash flows and/or assets.

By way of another example, FIG. 10 illustrates a packet 236 including a header 240, a map 242, process instructions 244, and output requirements 246. The header 240 includes packet header data, such as, creation, purpose, and transaction information. More specifically, packet header data in the header 240 can include packet ID (unique), packet type, packet state, date of when packet was created, time of when packet was created, user/System ID of creator of packet, and an indicator of whether the packet represents a security or is merely a reporting entity.

The map 242 includes information on cash flow and disclosure issues such as, an identifier, a cash flow quantity, a disclosure basis quantity, and a date in. Two exemplary ways in which the map 242 for a packet can be formed are GUI (graphical user interface)-based mapping and GUI-less mapping. The GUI-based mapping occurs when a user accesses a sift/sort screen to identify collateral. Once the collateral assets have been identified, the next step is to bring up a packet detail mapping GUI in which the user can select the specific sources of cash flow and quantities thereof to be added to the designated packet. These functions may be included as functions that may be performed by the GUI 150, described above.

The GUI-less mapping occurs when all the required elements of a packet are present. Accordingly, no GUI is needed to build the detailed packet map. In such scenario, a template by transaction type is used to set the default values in the resulting packet. This concept is described below.

A "transaction type" describes what type of business event is occurring, most often, but not always, indicating what type of security is being created. Transaction types can include MBS, ABS, REMIC, Whole Loan REMIC, Excess Servicing Strip, Grantor Trust, Structured Transaction (undifferentiated), Credit-Linked Note, SMBS (stripped MBS), Whole Loan Sale, or Loan Strip.

The GUI for packet detail mapping contains a list of possible sources of cash flow, and allows users to designate the quantity of each to be packetized. The possible sources of cash flow are derived from the nature of the underlying asset (s). If the collateral asset is another packet, only those cash flows that are included in the collateral packet (and therefore available for re-packeting) are displayed. If the asset is a mortgage loan, then loan-level cash flows are displayed. If possible, the screen derives which cash flows are available at the loan level based on what is (or will be) reported by the servicer. It is also possible that certain types of cash flows may be deemed unavailable for inclusion in the packet based on the accounting or business rules that are applicable to the cash flows.

In addition to selecting the cash flows to be placed in the packet, users can select the quantity to be packetized. Packet detail mapping templates are performed for different types of packets, based on transaction type. These templates store defaults for the cash flow elements and their quantities values. For example: if the packet type is "MBS Pool," the template automatically defaults the quantities of SCHEDULED UPB (unpaid balance) to 100%, SCHEDULED PRINCIPAL to 100%, UNSCHEDULED PRINCIPAL to 100%, and SCHEDULED INTEREST to the logical value given the target pass-thru rate of the MBS. If the transaction type is "Whole Loan REMIC" or "Excess Servicing Fee Strip," different templates with different default values are called.

In addition to mapping cash flow elements, the transaction type default template has a list of default disclosure reports. If an individual request to create a packet does not specify disclosure report types, this service assigns the disclosure reports for a given packet based on the defaults for the specified transaction type. The disclosure reports preferably include information to facilitate accounting for the packet to be created based on the accounting information received for the cash flows incorporated in the packet. For example, where the cash flow is considered a derivative cash flow, the accounting value of the packet may be determined based upon the value of the underlying asset from which the cash flow originates.

The GUI for mapping the data gives users the ability to map cash flows and quantities identically for all assets, for selected groups of assets, or one-by-one for individual assets. This GUI also allows users to specify quantities in a variety of formats: as specified values, as percentages, in basis points (bps) (for interest-related cash flow sources only), or as a formula. An example of the latter would be in an excess servicing fee strip, where the quantity of servicing fee to be packeted could be expressed as "all SF>25 bps at the loan level." Results of this GUI will be used to form the PACKET DATA USE MAP that completes the packet definition in the illustrated embodiment.

The process instructions 244 include information on cash flow processing, such as, roll-up frequency, payment and payoff activity cutoff, roll-up business rules, and applicable accounting rules. The output requirements 246 include information on cash flow output, such as, output reporting, accounting reporting, release date, and public or private status. Additional information can be included in the packet 236.

Figure 11:
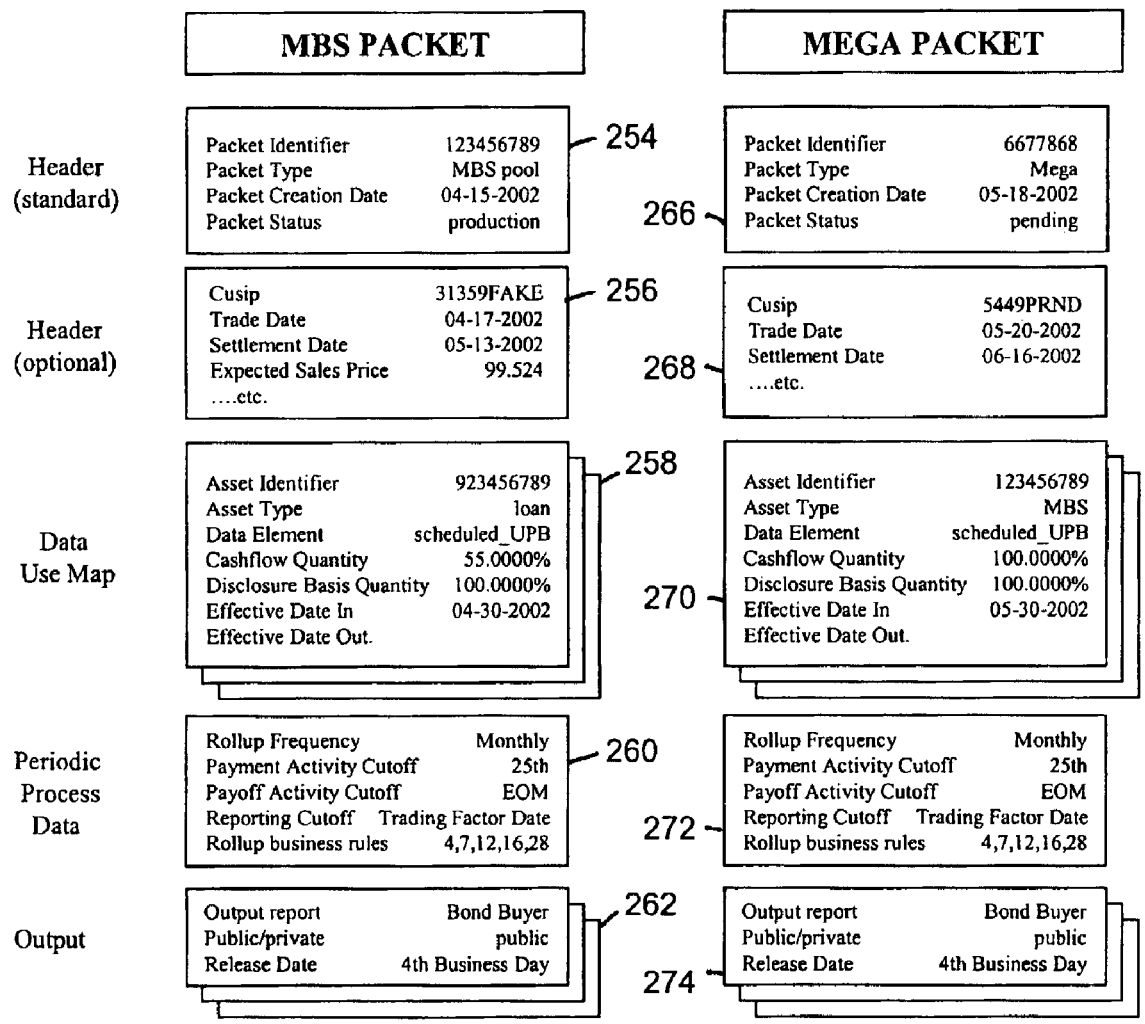
FIG. 11 is a diagrammatic representation of packet contents in an exemplary packet.

FIG. 11 illustrates packets 250 and 252 having exemplary packet content. The packet 250 is a MBS packet including a header 254, an optional header 256, a data use map 258, periodic process data 260, and output 262. The packet 252 is a Mega packet including a header 266, an optional header 268, a data use map 270, periodic process data 272, and output 274.

Figure 12:
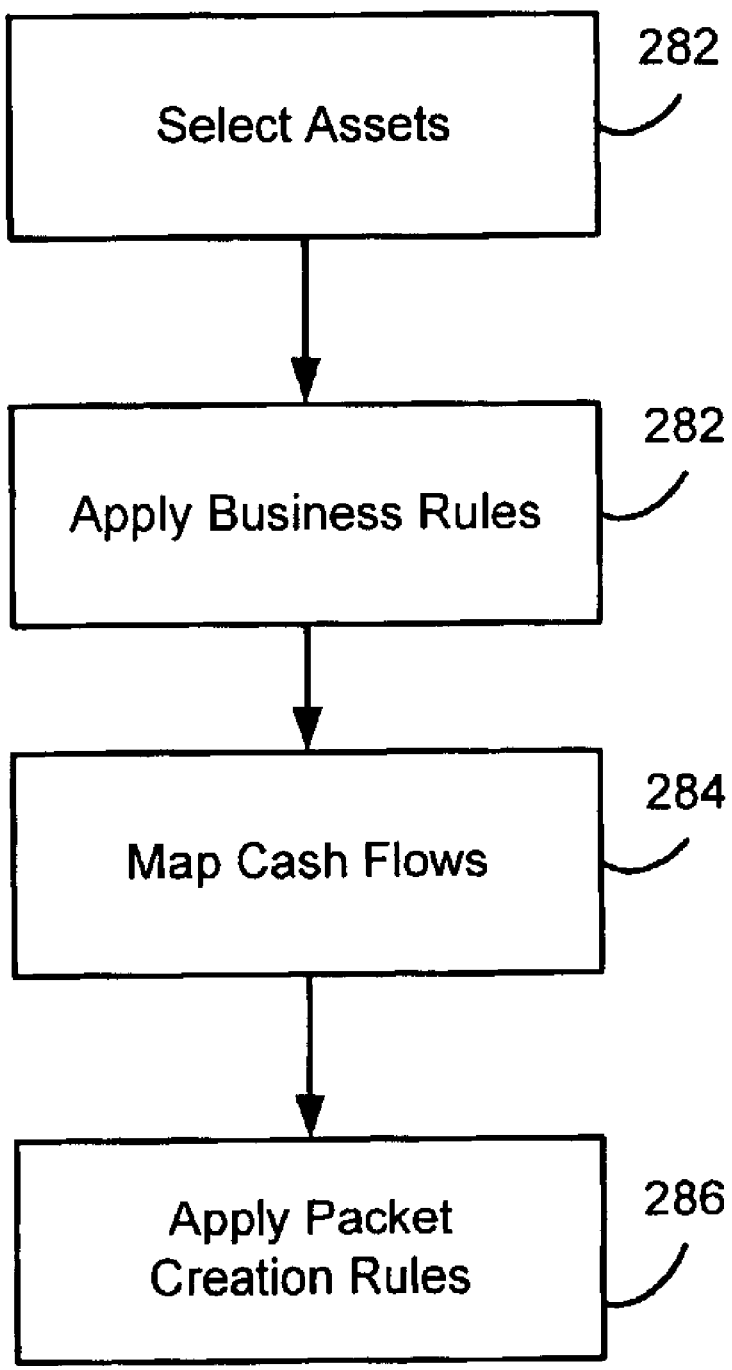
FIG. 12 is a flow diagram depicting exemplary operations in a method of creating packets.

FIG. 12 illustrates a flow diagram 280 of an exemplary method of creating packets. Whether creating a packet with or without a GUI, the process of creating a packet can include a step 282 in which assets are selected by a sift and sort process. In an exemplary sift process, assets are examined for selected attributes and the assets are grouped based on the selected attributes. For example, loans can be searched for 30 year fixed rate mortgages in New York. In an exemplary sort process, the results from the sort are prioritized. In the mortgage example given, the results could be prioritized based on length of term remaining.

After operation 282, a step 284 is performed in which loan/asset eligibility business rules are applied. Such rules provide a set of filters that override user-defined characteristics used in the sift and sort process. For example, a business rule may be that no more than 10% of loans can be relocation loans. Such a rule would place a limit on loan assets collected in the packet creation process.

In a step 286, detailed cash flows are mapped and in a step 288 packet creation business rules are applied. These results can be persisted in a database and the accounting and disclosure operations applied. The user can append or relax certain business rules specific to a deal, based on Deal ID.

Non-portfolio packet cash flows and assets can be analyzed with standard edits for completeness. Selected cash flows and assets are checked to ensure that they are not being used by another packet. Cash flows and assets may be reviewed under the edits and eligibility rules for packetization (specific rules vary according to packet type and may be specific to a single packet). Selected cash flows and assets may be selected that are in "production." Cash flows and assets may pass any additional business rules not covered by the eligibility rules. The cash flows that pass the rules are eligible to "belong" to the packet. Status of underlying cash flows and assets may then be appropriately updated based on packet state. Allocations of available cash flows may also be appropriately updated to reflect portions of cash flows no longer available. Accounting treatments of underlying cash flows and assets may also be updated, if necessary. Proper book and tax accounting for production packets may also occur. Appropriate disclosure reports may also be generated. Statistics for the packet may also be calculated (roll-up).

In certain situations, packets may need to be modified such as another user requiring a cash flow that is already in a pre-packet. Types of modifications to packets include removal of underlying cash flows, substitution of cash flows, and addition of cash flows. When a packet is modified, it goes through a subset of the steps required for packet creation. Production packets can require additional reporting, logging, and accounting steps.

Different types of updates can be applied to packets at different states. For example, modifications to selected assets made before the packet detailed map is created are local updates. Modifications made after the packet detailed map is created but while the packet is still in "pending" status are most likely to be triggered as a result of lender activity. Users may add, remove or substitute loans and/or cash flows in a pending packet. Modifications made to a production packet can be triggered by an attribute change processor (which, in the illustrated embodiment, is part of the system described below in connection with FIG. 13). Events such as BuyUp/BuyDown, Dissolves, and Loan Substitutions can trigger a packet modification event.

If a cash flow is added, removed or substituted (in essence, removed), the following actions happen on that cash flow. First, the status of underlying cash flows and assets is appropriately updated based on packet state. Conduit codes of underlying cash flows and assets are updated, if necessary. The cash flow link to the packet is removed.

Following the cash flow updates, the following events occur on the newly formed packet. First, added cash flows and assets pass standard edits for completeness. Next, the packet's cash flows and assets are checked to ensure that they are still eligible for packetization (e.g., another packet has not used them). Cash flows and assets pass the edits and eligibility rules for packetization (specific rules vary according to packet type).

As previously noted, accounting/reporting tools 17 apply applicable accounting rules to the packets to determine accounting reporting and actions. The origin and nature of the underlying cash flows are included in information associated with the packet to facilitate application of the accounting rules.

Cash flows and assets can be reviewed to ascertain whether they pass any additional business rules not covered by the eligibility rules. Proper book and tax accounting for production packets occur and appropriate reports are generated. Finally, statistics for the packet are re-calculated in a process referred to as "roll-up".

Packet dissolution arises from the same triggers as described with respect to packet modifications. In dissolving non-production packets, the underlying cash flows and assets have their status and conduit codes appropriately updated, and their links to the packet are removed. In essence, those cash flows are now available for use by another packet. The steps can include updating the status of underlying cash flows and assets, updating the conduit codes of underlying cash flows and assets, removing the cash flow link to the packet, marking the packet as having a state of Dissolved.

In an exemplary embodiment, the process of securitizing a packet occurs between the pending and production states and includes these functions: set-up and assigning of pool number and/or CUSIP, determination of issue date, settlement and issuance of the packet, accounting for production packets, and generating appropriate disclosure documentation and reports.

Roll-up takes the information contained in the packet and calculates summary cash flows, investor payments, as well as statistics about the packet. An example list of attributes resulting from the roll-up function include the calculation of: UPB (unpaid principal balance of the packet), WAC (weighted-average coupon or note rate of underlying mortgage loans), WAM (weighted-average maturity of underlying mortgage loans), WALA (weighted-average loan age of underlying mortgage loans), WALT (weighted-average loan term at origination of underlying mortgage loans), and GEODIST (geographical distribution of underlying mortgage loans). Not all of these attributes may be appropriate and what is calculated depends on the packet type. For packets that represent securities, such calculations will facilitate investor disclosure on a periodic basis.

Figure 13:
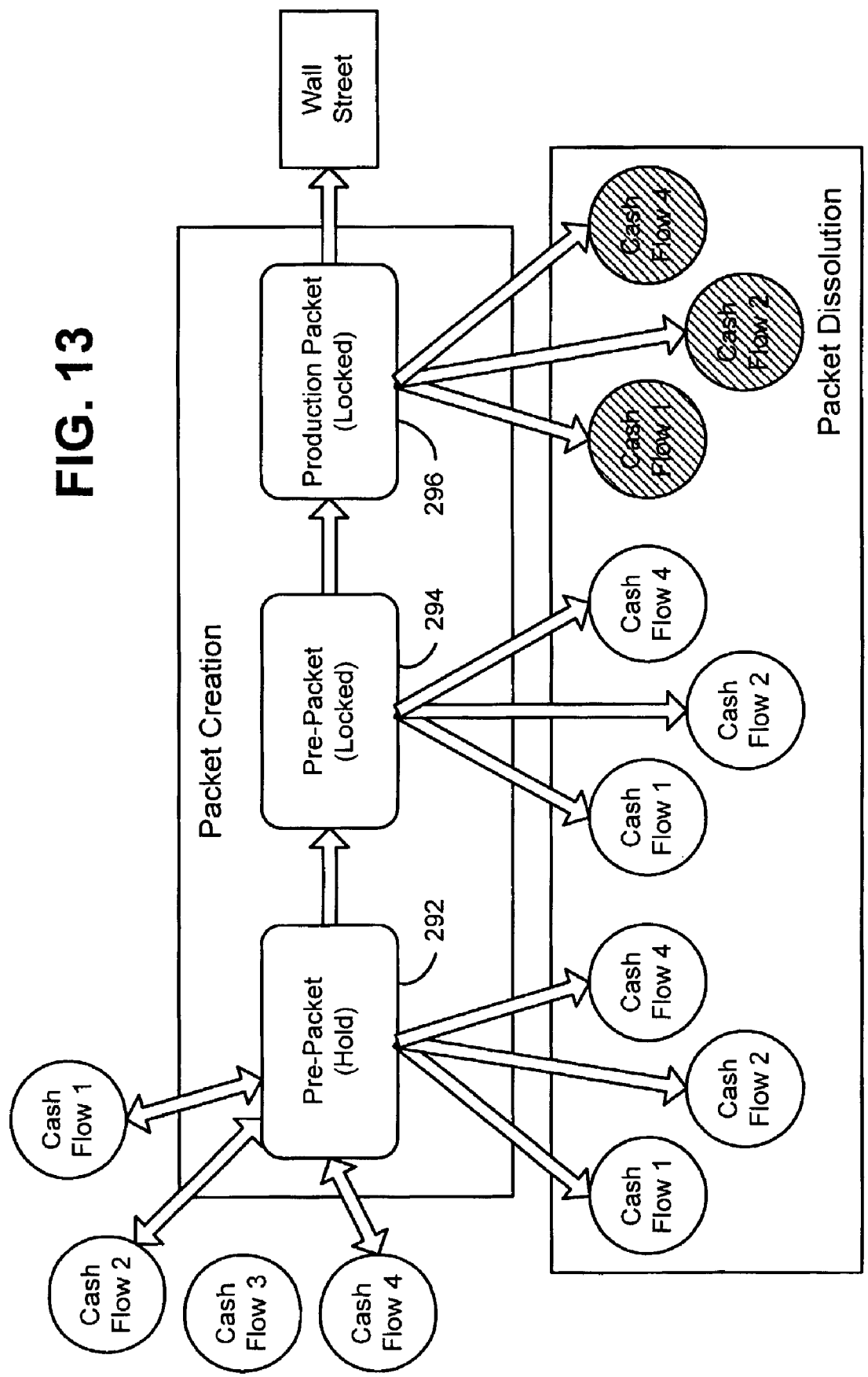
FIG. 13 is a diagram depicting exemplary packet creation operations and stages in a packet creation process in accordance with an exemplary embodiment.

Referring to FIG. 13, a packet creation system 290 is illustrated. In an exemplary embodiment, there are three main states that a packet can be in: a pre-packets state 292, a pending packets state 294, and a production packets state 296. Each of the saved versions is considered a pre-packet. Additionally, if a user sets up an Auto-Sift, the underlying cash flows that meet the sift criteria are placed in a pre-packet.

When the user decides that a given pre-packet is to be securitized, he/she can move the packet into the pending packet state 244. If the pending packet meets all of the necessary criteria, it can then be moved to the production packet state 296.

A pre-packet is a packet that has been created, but has not been confirmed as a pending packet or production packet. The cash flows or items contained in the packet are tagged as having a status of Hold so that other users are aware that the underlying items in the packet are being considered for production use.

Items contained in a pre-packet have a Hold status. If an item is tagged as having a status of Hold, it is visible to other users while they model the packet. Additionally, the person and the date and time in which that item was placed on Hold are persisted and available through the user interface. However, the cash flow or item cannot have a Hold status to be included other packets.

Under most circumstances, only the user that placed the cash flow/item on hold is allowed to remove the Hold status. However, in case of emergencies, a supervisor or designated super user can have "over-ride" capabilities to remove the Hold status. In this case, the user that placed the cash flow/item on hold is notified by email or page of this change.

The pending packet state is the state right before a packet becomes a production packet. The purpose of the pending packet state is to lock the cash flows while necessary edits, checks, and approvals are being performed before the packet is ready to become a production packet. The underlying cash flows of a pending packet are labeled with a status of Locked, and are therefore not available in the Sift/Sort tool for inclusion in the creation of other packets.

Items contained in pending packets have a Locked status. If an item is tagged as having a status of Locked, it is not be available for Sift/Sort and cannot be included in other packets. Items placed in a Locked status are limited in what can be done to them in that they are not available for Sift/Sort or Packeting. If an item belongs to a pending packet, it is possible to change the status from Locked to Hold or removing the Locked status altogether easily.

A production packet can be considered the most restrictive of the three packet types. Like the name states, a production packet is a packet that has been moved to production and has been securitized. The underlying cash flows of a production packet are labeled with a status of Locked, and are therefore not available for Sift/Sort.

Editing and dissolving production packets can be detailed, complex, and secure transactions. In order to edit or dissolve a production packet, the user has special permissions and the transactions have multiple control points. The creation, editing and dissolution of production packets cause accounting events to occur.

dissolved shall be stored. The effective dates are also stored, as this determines when the asset cash flows become available again.

At time of packet creation, much packet data defaults to a transaction type that the packet is being created for. However, a packet structure that is able to identify and handle exceptions to these defaults is needed to accommodate custom transactions Packets have a minimum required set of attributes, along with a variety of additional attributes. Table II illustrates the kinds of data in an exemplary packet:

TABLE II

Exemplary Packet Data

| PACKET ITEM | EXAMPLE DATA | WHERE FROM? |
|---|---|---|
| PACKET HEADER DATA | | |
| Packet ID (unique) | 123456789 | generated |
| Packet type | MBS pool, mega pool, pseudopool, reference pool | entered, trans mgr |
| Packet creation date | 04/15/2002 | generated |
| Packet status | production, pending | generated |
| OPTIONAL PACKET HEADER DATA | | |
| CUSIP number | 31359 | entered or trans mgr (Acq) |
| trade date | 04/17/2002 | entered (SPAM only) |
| settlement date | 05/13/2002 | entered (SPAM only) |
| expected sale price | 99.524 | entered (SPAM only) |
| prepayment model | PSA, CPR | selected (SPAM only) |
| prepayment speed | 240 (PSA), 15 CPR | entered (SPAM only) |
| initial security PTR | 7.00% | selected (SPAM), entered (Acq) |
| trade number | 605288B | entered (SPAM only) |
| business rules applied at creation | (as numbered in Acq business rules library) | packet creation |
| data as of date at creation | 03/31/2002 | packet creation |
| book cost basis | 99.12345 (price), $123,456,789.01 (dollar value) | packet creation (SPAM) |
| tax cost basis | 99.12345 (price), $123,456,789.01 (dollar value) | packet creation (SPAM) |
| PACKET DATA USE MAP | | |
| asset ID | loan number 123456789012, packet number 9876543210 | packet creation |
| asset type | loan, packet | packet creation |
| data element 1 | scheduled principal, net PTR interest, gross GF excess SF, UPB | packet creation |
| cashflow quantity 1 | 57.12345678%, 17.34 bps, $12.50 | packet creation |
| disclosure basis quantity 1 | 100.00% | packet creation |
| data element 1 effective date in | | substitution only |
| data element 1 effective date out | | substitution only |
| PERIODIC PROCESS DATA | | |
| rollup frequency | monthly, quarterly, annual | packet creation |
| payment activity cut-off date | calendar monthend, calendar quarterend, 15th, last business day | packet creation |
| payoff activing cut-off date | calendar monthend, calendar quarterend, 15th, last business day | packet creation |
| reporting cut-off date | since previous, preceeding calendar month, preceeding year | packet creation |
| rollup business rules to apply | (as numbered in SIR rules library) | packet creation |
| PACKET OUTPUT | | |
| output report 1 | Bond Buyer, Quartiles, ARMAT, pseudopool, GEODIST, FLIP | packet creation, entered |
| output release date | 4th business day, calendar quarterend + 3 business days | packet creation |
| public/private flag | public | entered |

NOTE:
There may be many iterations of data element + quantity for any one asset, and many assets.

Items contained in the production packets state 296 have a Production status. If an item is tagged as having a status of Production, it is not available for Sift/Sort and cannot be included in other packets. Items placed in a Production status are limited in what can be done to them in that they are not available for sift/sort or packeting. Guidelines with regards to changing the status from Production following a dissolution or change to a production packet are governed by the rules of the packet type.

If a packet is dissolved, its state is marked as Dissolved. Information as to the user, date and time that the packet was Table II reflects that a packet may store several pieces of information pertaining to its creation, such as what business rules were applied. Note also that the packet references pre-defined reports (which are defined elsewhere), and supplies the basis for computation in those reports (e.g. use 100% of UPB when computing WAC and WAM in the "Bond Buyer" report).

Some packets are associated with loan-level cash flows. A packet (or in some cases a chain of packets) describes how the underlying loan assets are associated with a "finished" deal-related product. However, to be fully useful to downstream processes, some data decomposition (or "internal re-mapping") may have to be applied first. Some of the data decomposition steps can precede packet creation and rollup, converting loan level data reported by lenders into a form useful to downstream processes. Data decomposition is not just related to packets; it is also necessary for accounting, analysis, and reporting. In cases where the internal use of lender reported inbound data differs from its use within a packet, data re-mapping is required for roll up. In some cases, this re-mapping may occur on a transaction-specific basis, and therefore be a by-product of the same event that also resulted in the creation of a packet. It also is possible that re-mapping is required several times as an asset is associated with additional transactions over time, such as MBS to Mega to REMIC.

Referring again to FIG. 13, when the decision is made to securitize a packet, the packet moves to the pending packet state 294 and the underlying assets get a status of Locked. A Pending Packet can be elevated to a Production Packet once all of the necessary steps have been taken. Assets remain Locked following a state change to Production. Alternatively, the packet could be dissolved, in which case the assets are freed up for another packet to use. Packet dissolution can also happen from the pre-packet state 292. If an OOP Production Packet is dissolved, for example, its assets may become available for use by another packet. When lender-formed packets are dissolved, the assets are normally returned to the lender.

If a user decides that he/she wishes to create a Packet, the user is allowed to create a pre-packet. The pre-packet places the underlying cash flows or items on Hold in addition to storing all of the information that is stored by a version defined above. Preferably, there is only be one pre-packet created for a given session. If a user decides that he/she wants to packetize a version that is being worked on, but he/she already has a pre-packet, he/she is asked to dissolve the previous pre-packet. Previously created pre-packets are dissolved before a version is available for packetization. Additionally, versions are allowed to view cash flows that have a Hold status if the Hold status was placed by a packet created in the same session.

III. Data Processing System

Figure 14:
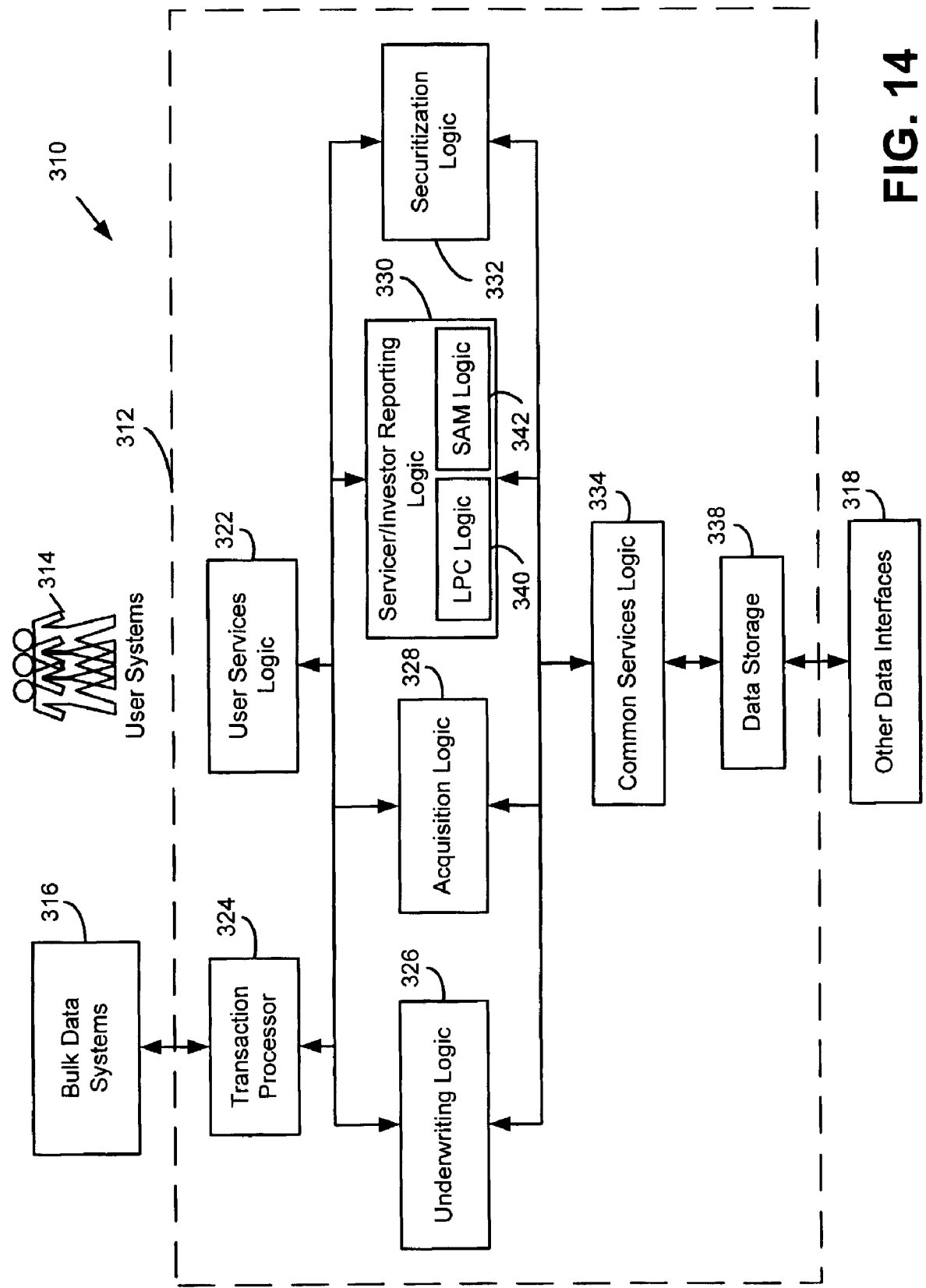
FIG. 14 is a block diagram of a data processing system usable to implement the cash flow engine and packeting systems of FIGS. 1-13.

Referring now to FIG. 14, a computer system 310 usable to implement the cash flow engine and packeting systems described above is shown. The computer system 310 is described in greater detail in "System and Method for Processing Data Pertaining to Financial Assets" Ser. No. 10/331,811, filed simultaneously herewith, hereby incorporated by reference.

As shown in FIG. 14, the system 310 comprises a data processing system 312, user systems 314, bulk data systems 316, and other data interfaces 318. The data processing system 312 further comprises user services logic 322, a transaction processor 324, underwriting logic 326, acquisition logic 328, servicer and investor reporting logic 330, securitization logic 332, common services logic 334, a data storage system 338, and other data interfaces 336. Although the term "logic" is used in connection with some blocks and the term "processor" is used in connection with other blocks, these two terms are used interchangeably. The term "processor" is used in the generic sense and is not meant to imply a separate discrete unit of processing hardware. Computer system 310 utilizes computer-executable instructions tangibly embodied on computer readable media, where the computer-executable instructions are executable by a computer to implement component element of computer system 310.

The data processing system 312 is configured for processing data pertaining to financial assets, such as loans and securities. In one embodiment, the data processing system 312 is configured to be used by a participant in the secondary mortgage market. Herein, for convenience, the participant is referred to as a "purchaser," although it should be understood that the purchaser may participate in the secondary market in other, different, or additional ways (e.g., as a loan guarantor, as a loan securitizer, and so on).

The data processing system 312 is preferably usable to support various types of transactions which may be executed by such a purchaser in connection with one or more loans. For example, the purchaser may purchase loans from lenders or other loan originators as part of a cash execution. The purchased loans may, for example, be held as investments in the purchaser's investment portfolio. Alternatively, the purchaser may create mortgage backed securities (MBS) as part of an MBS execution, or create other financial instruments or assets that are backed by cash flows associated with individual loans, including both loans that have been purchased by the purchaser and other loans that have not been purchased by the purchaser. For example, in the case of MBS, the purchaser may acquire a pool of loans, securitize the pool of loans to create MBS that is then sold to investors, and hold the pool of loans in trust for the benefit of the investors. The purchaser may also receive a fee for guaranteeing to holders of MBS or other financial instruments the repayment of the loans by borrowers. The purchaser may also use loans to create other types of financial assets or instruments, for example, by purchasing loans and selling the financial instruments to investors, or by performing such services for other owners of loan assets.

The acquisition logic 328 is preferably usable to perform such operations as receiving information such as loan term, interest rate, principal owed and other parameters regarding loans when loans are first purchased or otherwise acquired and entered into the data processing system 312. In the case of cash executions, the acquisition logic 328 is also used to perform such operations as receiving commitments for the purchased loans.

The servicer and investor reporting logic 330 is used to perform loan accounting and generate accounting output in connection with the purchased loans. Herein, the terms "reporting logic" and "servicer and investor reporting logic" are used interchangeably and both refer to logic that is configured to perform loan accounting and generate accounting output (e.g., for purposes of investor reporting, for purposes of managing a loan portfolio, and so on) in connection with a plurality of loans. The servicer and investor reporting logic 330 preferably performs such functions as receiving loan payment data on an ongoing basis from third party servicers. In this regard, it may be noted that the servicer and investor reporting logic 330 in the illustrated embodiment is not used for servicing loans directly but rather merely interfaces with loan servicing logic provided by a third party servicer. Of course, the servicer and investor reporting logic 330 could also be configured to include additional logic for servicing loans, either as part of the servicer and investor reporting logic 330 or as part of another functional block. The accounting output generated by the servicer and investor reporting logic 330 may include such things as accounting, tax, performance/valuation, and/or other relevant financial information for the loans in the portfolio.

The servicer and investor reporting logic 330 includes loan process and compare (LPC) logic 340, which monitors and verifies the activities of third party mortgage servicers on an ongoing basis. The logic 330 includes logic that implements the accounting/reporting tools 17 of FIG. 1. The LPC logic 340 performs processing related to decomposing borrower payments into sub-loan level cash flows in accordance with the CFAS maps discussed above in connection with FIGS. 3-5. Thus, the LPC logic 340 performs such operations as receiving and validating reporting information pertaining to loan activity, loan delinquency information and unpaid balance comparison reported by the servicer, updating the records of the data processing system 312 regarding the status of all reported loans, and determining the remittance and disbursement amounts that are expected for the loans. The LPC logic 340 also computes and monitors cash flows entering into the packets.

The servicer and investor reporting logic 330 also includes securities aggregation and management (SAM) logic 342 which receives the loan level cash flow information produced by the LPC logic 340 and aggregates this cash flow information to produce security level information and generate disclosure reports. The SAM logic 342 performs processing related to the PCFA maps discussed above in connection with FIGS. 5-7. The SAM logic 130 is capable of processing and managing any grouping of loans, cash flows from loans, and other financial instruments. Using a packet activity processor, the SAM logic 342 determines the loans in a given pool, repackages cash flows based on the pool and loan level attributes for all the loans and then updates the system database. The packet activity processor has the flexibility to repackage loan level cash flows at the most granular level to security level enabling the SAM logic 342 to also manage specific cash flow strips (e.g., access yield strips, interest only strips). At the end of appropriate processing periods, the SAM logic 342 finalizes the relevant security information. The SAM logic 342 then uses a packet disclosure processor to make final remittance level principal and interest, guaranty fee, and other draft amounts and security accounting data available to other components the data processing system 312. The SAM logic 342 also includes packet modification request processing logic which is used to modify packets.

The securitization logic 332 is used to generate financial assets and includes logic that implements the decomposition/repackaging tool 16 described above in connection with FIG. 1. Herein, the terms "financial asset generation logic" and "securitization logic" are used interchangeably and refer to any logic that is used to generate/create financial assets. The securitization logic 332 may be used to generate financial assets such as MBS, debt instruments, or any of the other types of financial instruments described herein. The securitization logic 332 may be used to generate financial assets that are tracked internally in situations where the owner/operator of the data processing system 312 purchases a pool of loans and holds the loans as an investment in its own portfolio.

The common services logic 334 includes a rules engine. The rules engine comprises a series of business rules used in decomposing and repackaging cash flows and performing other loan processing.

Preferably, operators access the data processing system 312 through the Internet by using a personal/laptop computer or other suitable Internet-enabled device. For example, the data processing system 312 may be accessible to users by visiting an internal web site of the entity that performs the cash flow decomposition/repackaging (that is, the web site of the entity that owns/operates the data processing system 312, and that is assumed to be in the business of purchasing, guaranteeing, and/or securitizing loans) and clicking on appropriate links located at the web site.

It will be appreciated that the data processing system 312 may perform fewer or additional functions as compared to those described herein. For example, an entity that performs only some of the above-mentioned processes may use a computer system that contains only a subset of the functions described herein.

The preferred data processing system 312 exhibits a high level of data, service and time granularity. With respect to data granularity, the system 312 is capable of decomposing loans into a series of highly granular cash flows and tracking all of the cash flows from the point the cash flows enter the data processing system 312 (e.g., as part of a loan payment or other cash flow source) to the point the cash flows exit the data processing system 312 (e.g., as part of a payment on a financial instrument), as previously described. The decomposition and mapping of cash flows dramatically increases the number of different types of financial instruments that may be created, because it makes it possible to create financial instruments based on these other cash flows. In turn, this makes it possible to create financial instruments that are more optimally configured to meet the needs of the owner of the financial instrument.

With respect to service granularity, the data processing system 312 represents loans as a series of attributes and uses a business rules engine to process loan information. This dramatically simplifies the process of expanding the capabilities of the data processing system 312 to process data associated with new types of loans. The capability to process a new type of loan may be added by adding an additional attribute to a list of available attributes corresponding to the new product feature (or modifying existing attributes), by using the attribute to indicate the presence or absence (and/or other characteristics about the new feature) in a particular loan, and by modifying the rules engine may then be modified to incorporate additional rules regarding the new loan feature. It is not necessary to build a completely new data processing system for the new type of loan. This makes it easier to offer new types of loans which are more optimally configured to meet the needs of individual borrowers. An exemplary set of attributes is described at the end of this section.

With respect to time granularity, the data processing system 312 is capable of processing data using a much smaller time slice or update period than has been possible in the past. In the past, systems have typically been constructed around the assumption that servicers provide monthly reports which summarize loan activity that occurred during the previous month. The time slice for reporting has been one month and sub-monthly temporal data has been lost. In the data processing system 312, when information regarding new loans is received by the acquisition logic 328 and/or when information regarding loan payments is received by the servicer and investor reporting logic 330, this information preferably includes information regarding the date the loan was acquired, the date or dates within each month or other period other period on which a payment or other transaction is expected, and/or the date the payment was received. The time slice in the data processing system 312 is therefore one day (or less, if a smaller time slice such as AM/PM, hour, minutes, seconds, and so on, is used). The temporal information is stored and maintained in databases which are synchronized/commonly accessible by the acquisition logic 328, the servicer and investor reporting logic 330, and the securitization logic 332. As a result, the acquisition logic 328, the servicer and investor reporting logic 330, and the securitization logic 332 each have access to this highly granular temporal information regarding loan acquisitions and payments. The increased time granularity supports the above-mentioned capabilities to offer a wider array of loans to borrowers and a wider array of financial instruments to investor. For example, the increased time granularity facilitates offering loan products in which the borrower is expected to make bi-weekly payments, which may be attractive to borrowers that get paid bi-weekly instead of twice-monthly or monthly. This also facilitates handling loan products in which the date of a transaction is meaningful, such as daily simple interest loans. Further, because sub-loan cash flows can be processed using a one day time slice (or less), it is possible to create financial instruments based on cash flows that are processed on a per day basis.

Another benefit of the acquisition logic 328, the servicer and investor reporting logic 330, and the securitization logic 332 being provided on a common platform and access common/synchronized databases is that each system has an up to date view of the data. As previously indicated, the data processing system 312 has the ability to accept payment and other transaction information from a servicer as such transactions occur (e.g., using daily, hourly, or near real-time updates) instead of or in addition to receiving end of the month summary transaction information from the servicer. Once the data is received, it is accessible throughout the data processing system 312. For example, it is not necessary to limit the data updates for the securitization logic to a once-per-month basis at the end of a servicing cycle. Therefore, an up to date view of the data is available throughout the data processing system 312.

It should also be apparent that it is also possible to construct data processing systems which do not incorporate the advantages described herein in connection with the data processing system 312, or which also incorporate additional advantages not described herein. Further, it may also be noted that the separation of functionality shown in FIG. 14 is necessarily to some extent conceptual, and it is also possible to provide the same functionality in other ways. Additionally, although numerous functions are described below, it may be noted that it may be desirable to provide fewer, additional, or different functions in a given data processing system depending on the application and what is needed.

Throughout the specification, numerous advantages of preferred embodiments have been identified. It will be understood of course that it is possible to employ the teachings herein without necessarily achieving the same advantages. Additionally, although many features have been described in the context of a particular data processing system, it will be appreciated that such features could also be implemented in the context of other hardware configurations. Further, although various figures depict a series of steps which are performed sequentially, the steps shown in such figures generally need not be performed in any particular order. For example, some of the steps may be performed essentially simultaneously. Additionally, some steps shown may be performed repetitively with particular ones of the steps being performed more frequently than others. Alternatively, it may be desirable in some situations to perform steps in a different order than shown.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A system for creating and maintaining financial assets which accentuate different types of sub-loan level risk associated with a plurality of home mortgage loans and which are configured to operate as hedges against risks that oppose the different types of sub-loan level risk, comprising:
a processor configured to execute computer-executable instructions tangibly embodied on computer readable media, the computer-executable instructions being executable by the processor to implement
a decomposition tool configured to decompose each of the plurality of home mortgage loans into a plurality of sub-loan level cash flows;
a repackaging tool configured to repackage the plurality of sub-loan level cash flows to form the financial assets, including:
selecting a sub-combination of the plurality of sub-loan level cash flows, the sub-combination of sub-loan level cash flows comprising sub-loan level cash flows from across the plurality of home mortgage loans, and the sub-combination of sub-loan level cash flows exhibiting heightened sensitivity to at least one of the different types of sub-loan level risk relative to the sensitivity exhibited by the plurality of home mortgage loans as a whole,
packaging the sub-combination of sub-loan level cash flows to create one of the financial assets, the financial asset that is created accentuating the at least one of the different types of sub-loan level risk in accordance with the heightened sensitivity exhibited by the sub-combination of sub-loan level cash flows, thereby configuring the financial asset to operate as a hedge against a risk that opposes the at least one of the different types of sub-loan level risk, and
repeating the selecting and packaging steps to create additional financial assets, the additional financial assets including different financial assets which accentuate other ones of the different types of sub-loan level risk; and
an accounting tool configured to make a determination of accounting rules that apply to the financial assets, the accounting tool further configured to track accounting data for the financial assets based at least in part on the accounting rules; and
a data storage system configured to store accounting data for the financial assets.

2. A system according to claim 1, wherein the plurality of sub-loan level cash flows include a first plurality of sub-loan level cash flows derived from principal payments of a borrower, a second plurality of sub-loan level cash flows derived from interest payments of a borrower, and a third plurality of sub-loan level cash flows derived from borrower-paid fees.

3. A system according to claim 2, wherein the plurality of sub-loan level cash flows include a sub-loan cash flow that is a negative cash flow from a perspective of one or more owners of the plurality of financial assets, the negative subloan cash flow being associated with expenses incurred in connection with the respective loan and arising from borrower default.

4. A system according to claim 2, wherein the second plurality of sub-loan level cash flows derived from interest payments include a cash flow associated with servicing fees, a cash flow associated with guarantee fees, and a cash flow associated with pass through interest.

5. A system according to claim 1, wherein the data storage system is further configured to store information pertaining to a mapping relationship between the plurality of financial assets and the plurality of sub-loan level cash flows, the mapping relationship describing a manner in which cash flows flowing into each of the plurality of financial assets are traceable back to the plurality of sub-loan level cash flows.

6. A system according to claim 5, wherein the repackaging tool is further configured to display the information pertaining to the mapping relationship to a human operator.

7. A system according to claim 5, wherein the computer-executable instructions are further executable by the processor to implement accounting logic configured to apply accounting rules to the plurality of financial assets.

8. A system according to claim 1, wherein the computer-executable instructions are further executable by the processor to implement a financial engineering tool configured to display an impact of accounting on the financial performance of the plurality of financial assets.

9. A system according to claim 1, wherein the computer-executable instructions are further executable by the processor to implement a financial engineering tool configured to analyze financial risk associated with the plurality of sub-loan level cash flows and display a graphical representation of the financial risk to a human operator.

10. A system according to claim 1, wherein at least one of the plurality of financial assets is a financial instrument backed by borrower paid fees and not by principal or interest, and wherein an owner of the financial instrument is paid with funds derived from proceeds of borrower paid fees.

11. A system according to claim 1, wherein the financial assets are sold to different investors in the capital markets, thereby permitting the different investors to hedge against the risks that oppose the different types of sub-loan level risk.

12. A system for creating and maintaining financial assets which accentuate different types of sub-loan level risk associated with a plurality of home mortgage loans, the plurality of home mortgage loans each having a loan asset and a servicing asset, comprising:

a processor configured to execute computer-executable instructions tangibly embodied on computer readable media, the computer-executable instructions being executable by the processor to implement servicer reporting logic configured to account for a compensation provided to a servicer, the servicer reporting logic further configured to relate the compensation to the value of the home mortgage loan, wherein compensation provided to the servicer does not decrease through time during a term of the loan; and a repackaging tool configured to repackage the plurality of sub-loan level cash flows to form the financial assets, including:

selecting a sub-combination of the plurality of sub-loan level cash flows, the sub-combination of sub-loan level cash flows comprising compensation provided to the servicer from across the plurality of home mortgage loans, and the sub-combination of sub-loan level cash flows exhibiting heightened sensitivity to at least one of the different types of sub-loan level risk relative to the sensitivity exhibited by the plurality of home mortgage loans as a whole, packaging the sub-combination of sub-loan level cash flows to create a financial asset, and repeating the selecting and packaging steps to create additional financial assets, the additional financial assets including different financial assets which accentuate other types of sub-loan level risk.

13. A system according to claim 12, wherein the loan comprises a loan asset and a servicing asset, the loan asset comprising a right to receive loan payments from a borrower in connection with the loan, the loan payments comprising a principal payment portion and an interest payment portion, the servicing asset comprising a right to receive a servicing fee portion of the interest payment portion in exchange for performing servicing of the loan, wherein the servicing fee portion of each loan payment decreases as an unpaid principal balance of the loan decreases.

14. A system according to claim 13, wherein compensation provided to the servicer is substantially fixed during the term of the loan.

15. A system according to claim 13, wherein compensation provided to the servicer increases during the term of the loan.

16. A system according to claim 13, wherein relating the compensation to the home mortgage loan includes valuing the compensation based on the value of the home mortgage loan.

* * * * *